US012793508B2

(12) United States Patent
Berman

(10) Patent No.: US 12,793,508 B2
(45) Date of Patent: Nov. 10, 2026

(54) GAMING DEVICE HAVING MULTI-CHANCE FEATURE

(71) Applicant: KING SHOW GAMES, INC., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 205 days.

(21) Appl. No.: 18/745,402

(22) Filed: Jun. 17, 2024

(65) Prior Publication Data

US 2024/0339004 A1 Oct. 10, 2024

Related U.S. Application Data

(63) Continuation of application No. 18/111,820, filed on Feb. 20, 2023, now Pat. No. 12,014,601, which is a continuation of application No. 17/222,551, filed on Apr. 5, 2021, now Pat. No. 11,587,402, which is a continuation of application No. 16/841,675, filed on Apr. 7, 2020, now Pat. No. 10,970,970.

(60) Provisional application No. 62/829,648, filed on Apr. 5, 2019.

(51) Int. Cl.
*G07F 17/32* (2006.01)

(52) U.S. Cl.
CPC ...... *G07F 17/3262* (2013.01); *G07F 17/3211* (2013.01); *G07F 17/3293* (2013.01)

(58) Field of Classification Search
CPC ............. G07F 17/3262; G07F 17/3211; G07F 17/3293
USPC ................................................ 463/13, 12, 11
See application file for complete search history.

(56) References Cited

U.S. PATENT DOCUMENTS

2007/0298874 A1* 12/2007 Baerlocher ......... G07F 17/3209 463/27
2008/0076552 A1* 3/2008 Baerlocher ......... G07F 17/3262 463/31
2009/0191964 A9* 7/2009 Baerlocher ............. G07F 17/34 463/31
2013/0178260 A1* 7/2013 Baerlocher ......... G07F 17/3258 463/16
2014/0162749 A1* 6/2014 Ryan .................. G07F 17/3213 463/20
2014/0162751 A1* 6/2014 Ryan .................. G07F 17/3267 463/20
2015/0317879 A1* 11/2015 Baerlocher ......... G07F 17/3209 463/16

* cited by examiner

*Primary Examiner* — Pierre E Elisca

(57) ABSTRACT

Embodiments of the present invention set forth systems, apparatuses and methods for providing a feature in gaming devices with multiple chances of using an awarded modifier. Accordingly, a gaming device can include a display, and a processor configured to execute operations that include facilitating participation in a first gaming event and determining if a bonus feature is triggered during the first gaming event. When the feature is triggered, the operations further include determining an awarded modifier, and determining if the modifier is to be used in the first gaming event based on whether a predefined condition is satisfied. If the awarded modifier is not used in the first gaming event, the modifier is then applied in a second, subsequent gaming event.

20 Claims, 44 Drawing Sheets

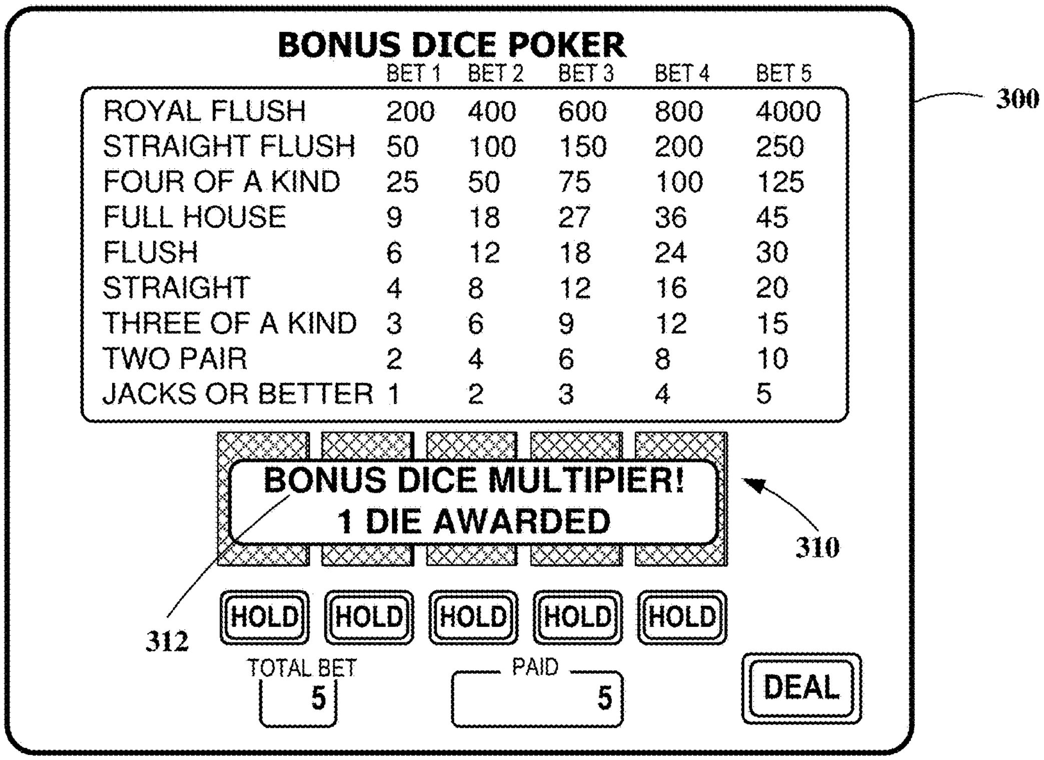
FIG. 3A
FIG. 3B
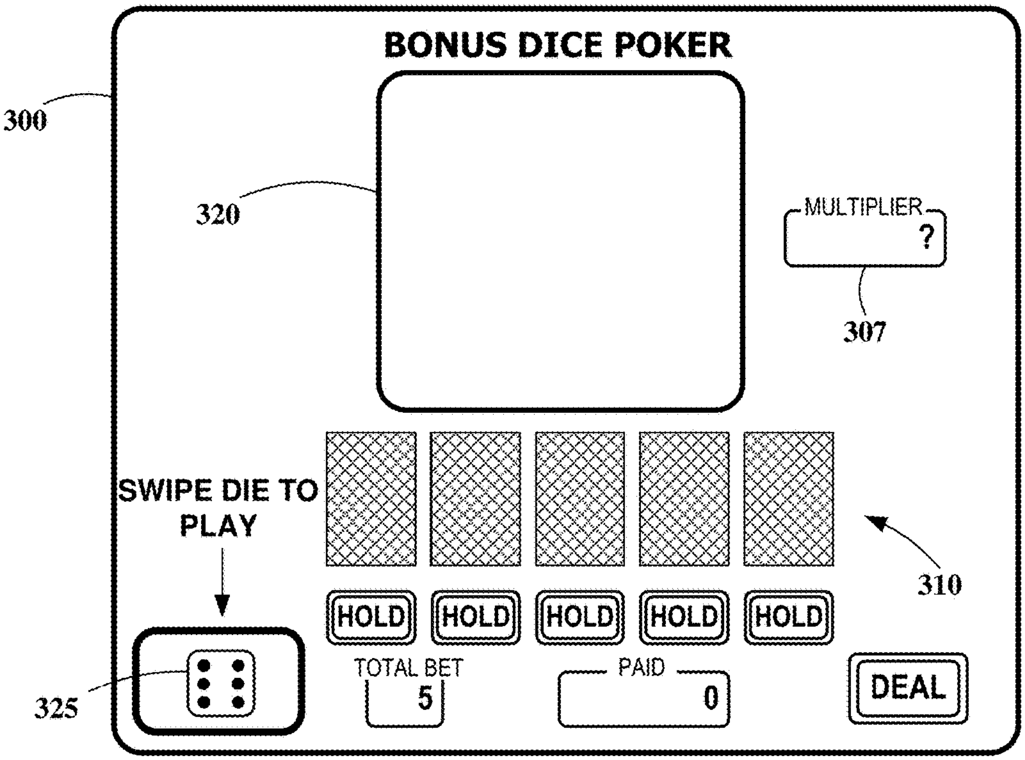

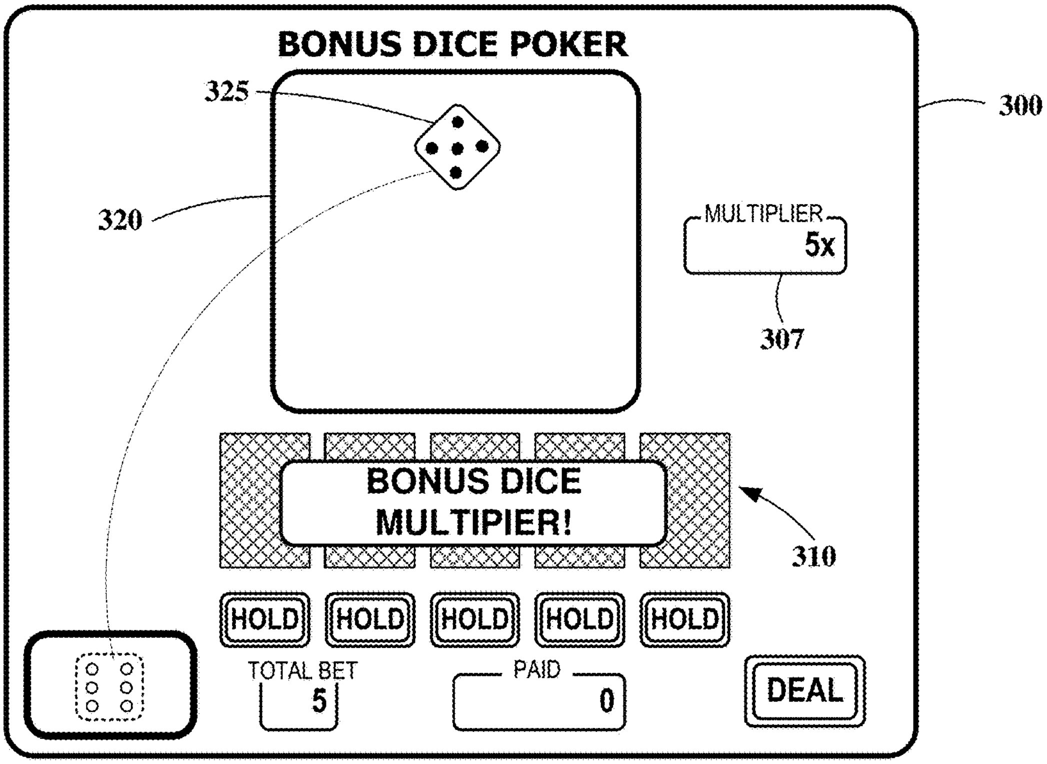
FIG. 3C
FIG. 3D
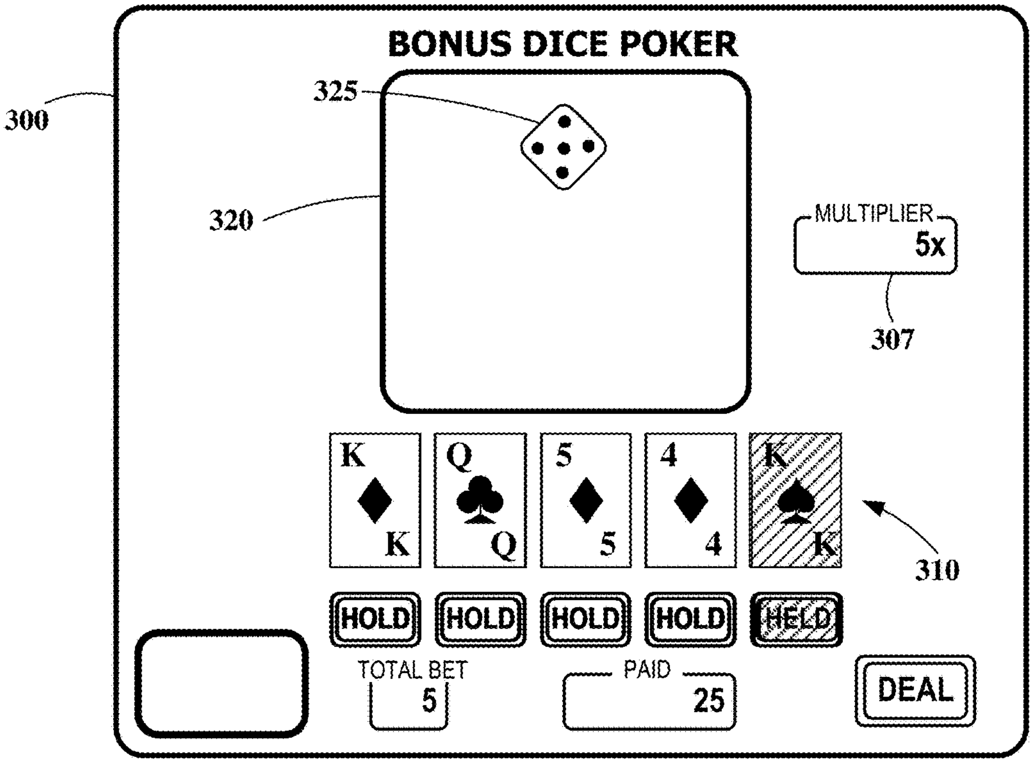

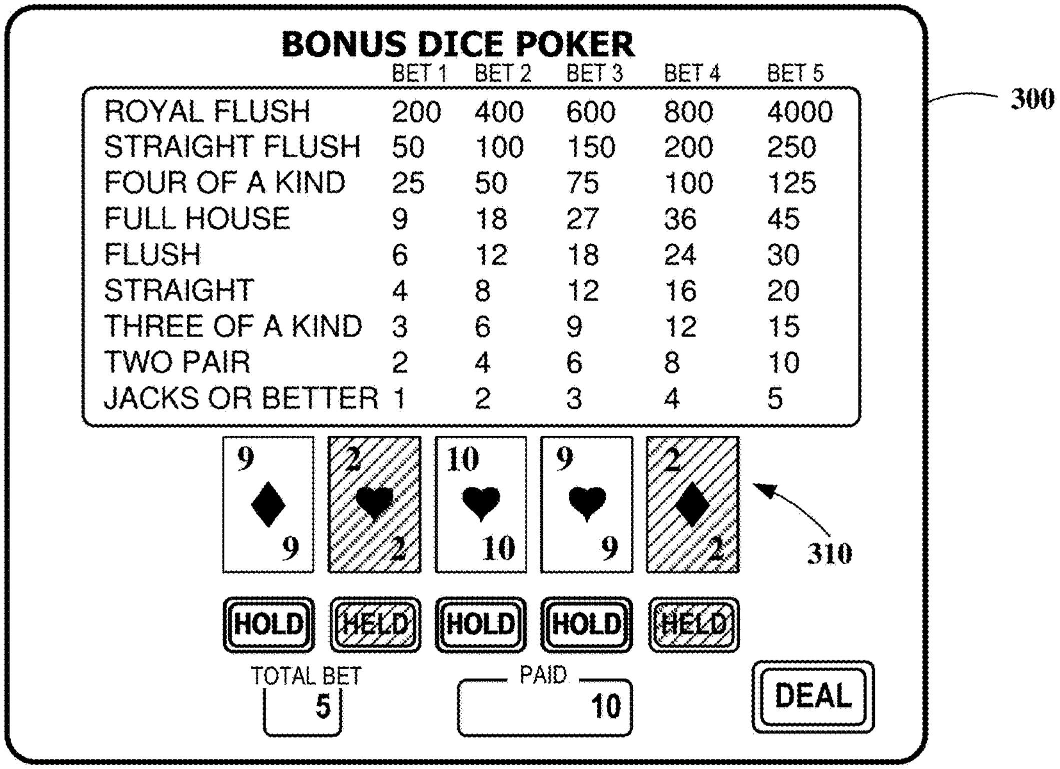
FIG. 3E
FIG. 3F
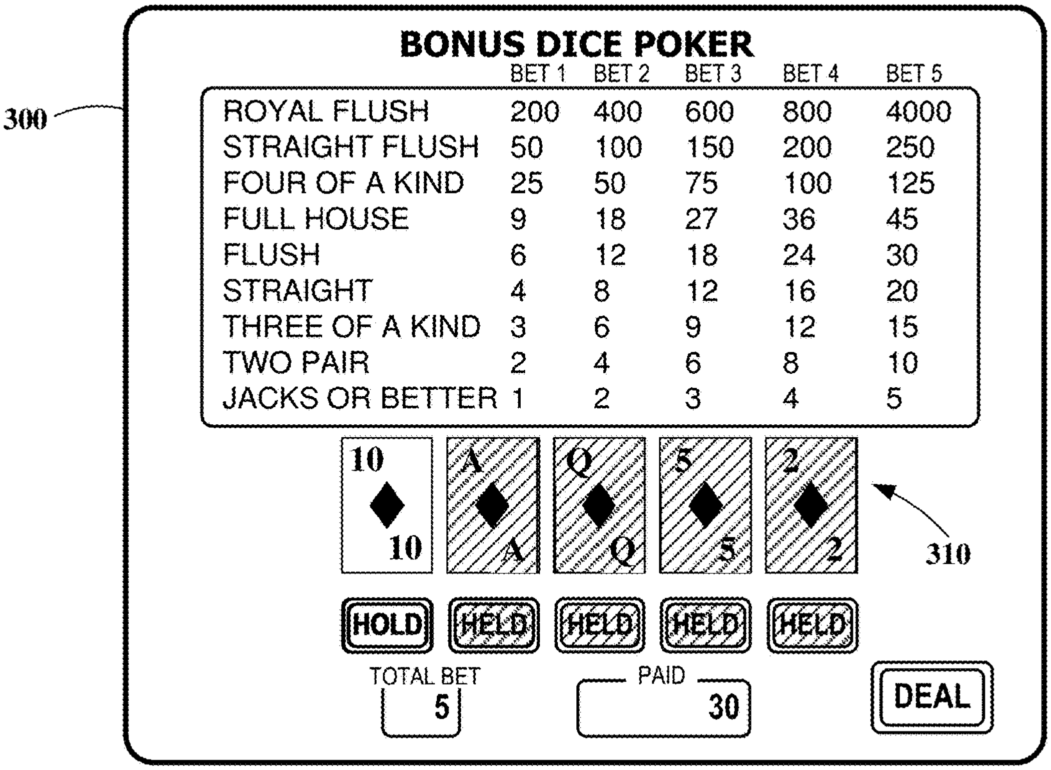

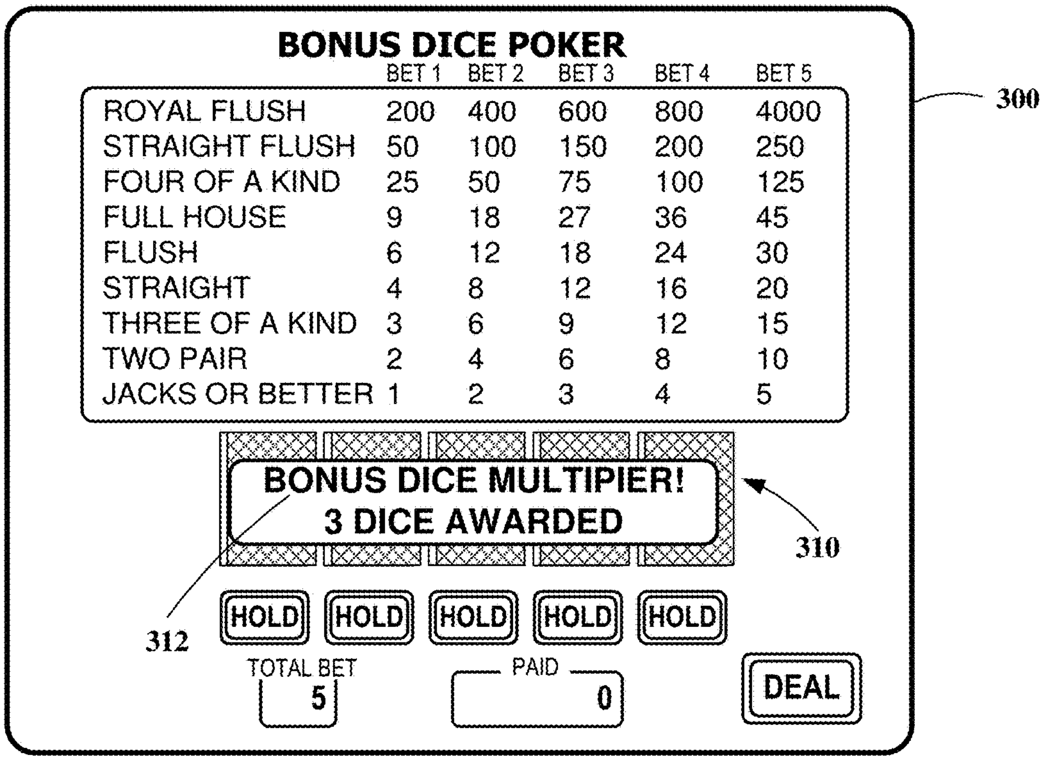
FIG. 3G
FIG. 3H
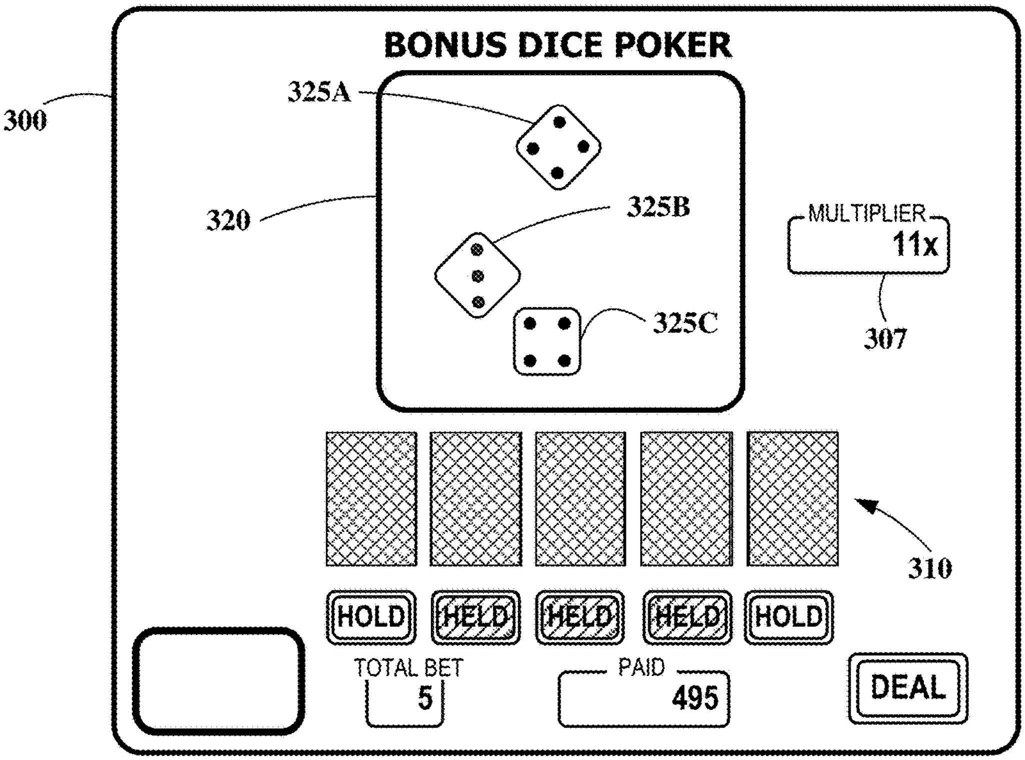

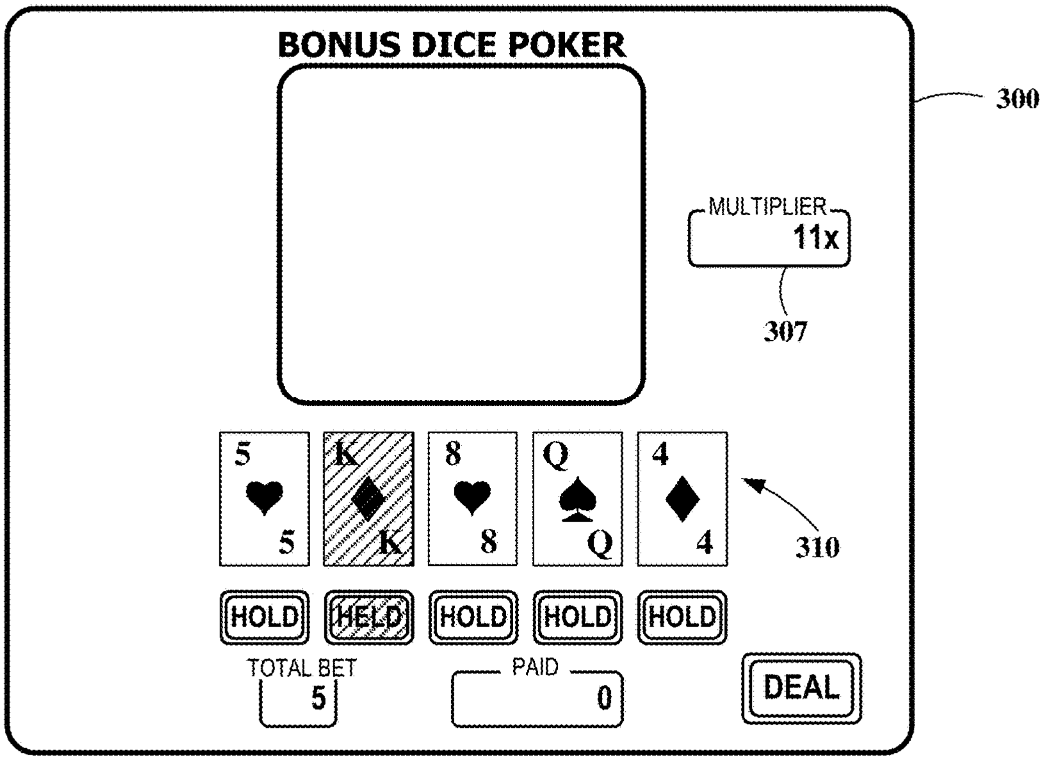
FIG. 3I
FIG. 3J
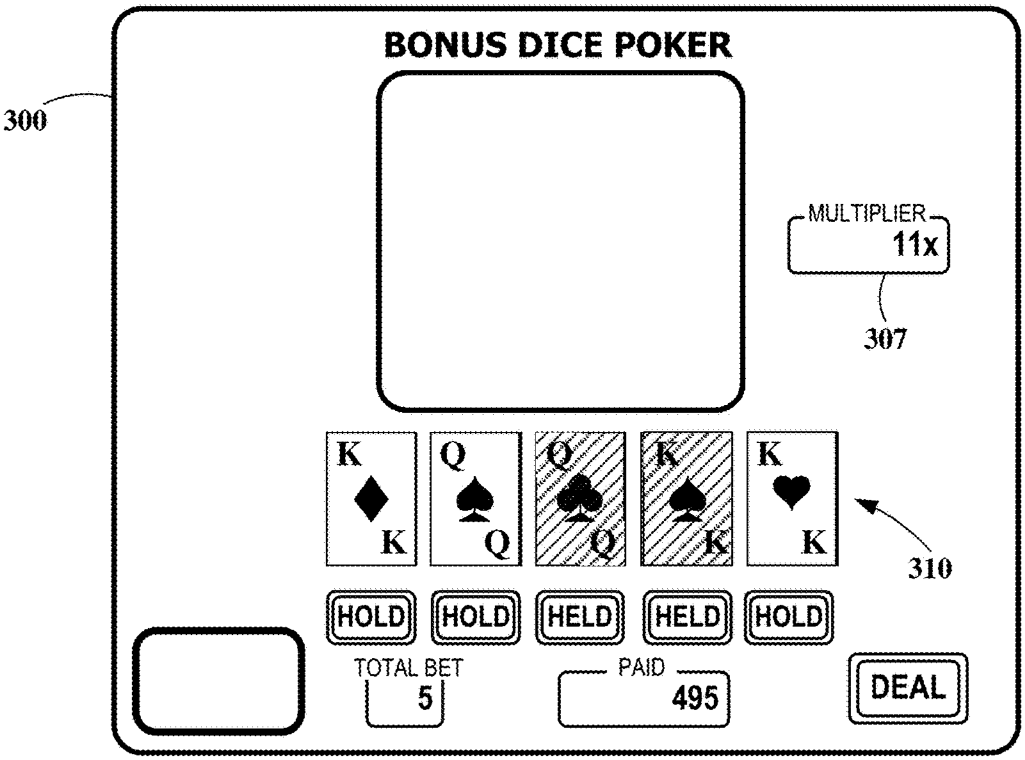

GAMING DEVICE HAVING MULTI-CHANCE FEATURE

RELATED APPLICATIONS

This application is a continuation of U.S. application Ser. No. 18/111,820, filed Feb. 20, 2023, now U.S. Pat. No. 12,014,601, which is a continuation of U.S. application Ser. No. 17/222,551, filed Apr. 5, 2021, now U.S. Pat. No. 11,587,402, which is a continuation of U.S. application Ser. No. 16/841,675, filed Apr. 7, 2020, now U.S. Pat. No. 10,970,970, which claims the benefit of Provisional Patent Application No. 62/829,648, filed on Apr. 5, 2019, to which priority is claimed pursuant to 35 U.S.C. § 119 (e), all of which are hereby incorporated herein by reference in their entirety.

FIELD OF THE INVENTION

This disclosure relates generally to games, and more particularly to systems, apparatuses and methods for providing a feature with multiple chances of using an awarded modifier in gaming devices.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate providing a feature with multiple chances of using an awarded modifier.

In one embodiment, a gaming device includes a display, and a processor configured to execute operations that include facilitating participation in a first gaming event and determining if a bonus feature is triggered during the first gaming event. When the feature is triggered, the operations further include determining an awarded modifier, and determining if the modifier is to be used in the first gaming event based on whether a predefined condition is satisfied. If the awarded modifier is not used in the first gaming event, the modifier is then applied in a second, subsequent gaming event.

In another example embodiment, a gaming device includes a display, and a processor configured to execute operations that include facilitating participation in a first gaming event and determining if a bonus feature is triggered during the first gaming event. When the feature is triggered, the operations further include determining an awarded modifier, using the awarded modifier in the first gaming event and further using the awarded modifier in at least one second, subsequent gaming event.

BRIEF DESCRIPTION OF THE DRAWINGS

FIGS. 3A-3J are detail diagrams of a game display illustrating a game progression according to embodiments of the invention.

DETAILED DESCRIPTION

Figure 1:
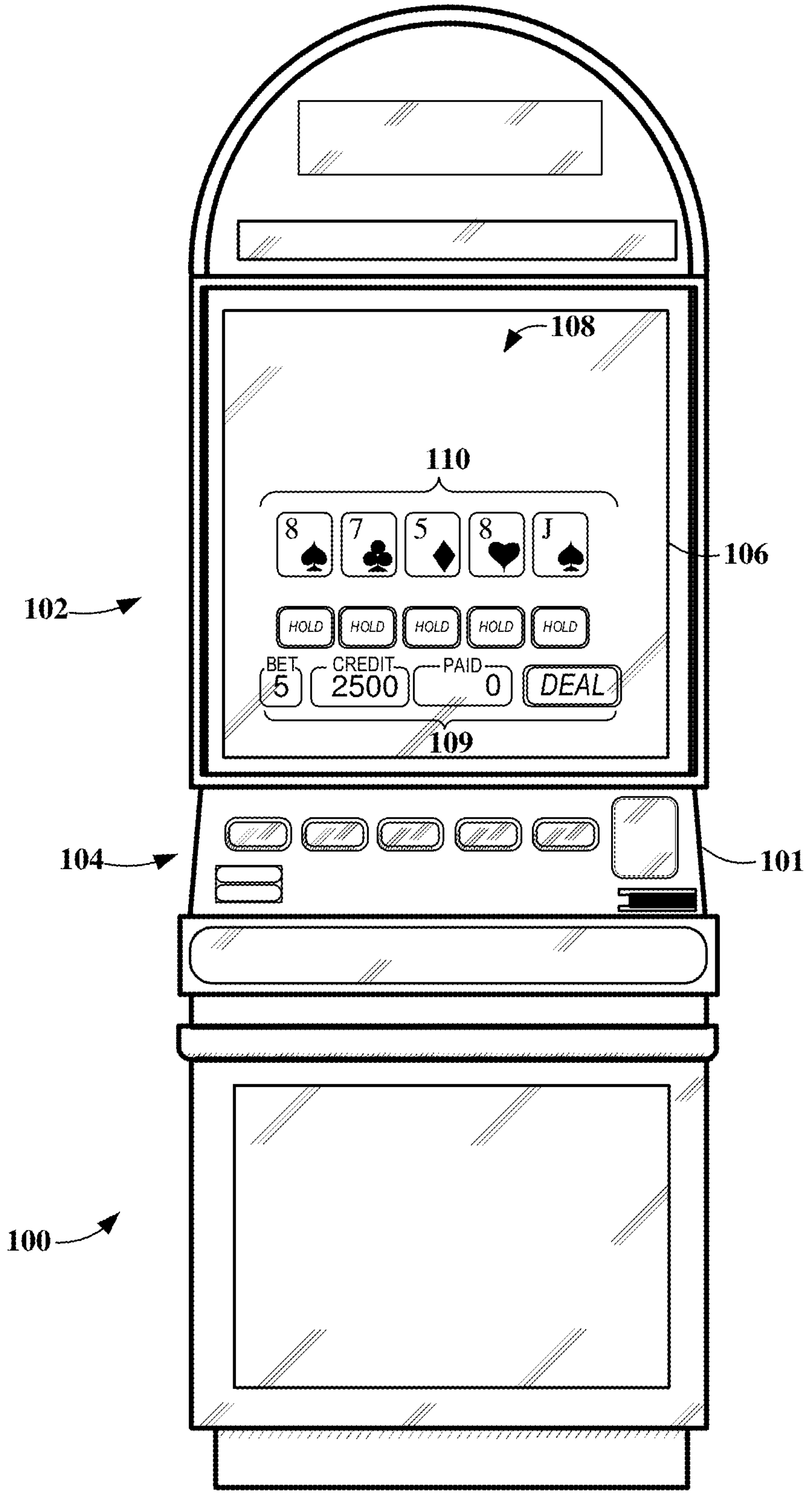
FIG. 1 is a diagram of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatus.

In various embodiments of the invention, the gaming displays are described in conjunction with the use of data in the form of "symbols." In the context of this disclosure, a "symbol" may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for enhancing winning result opportunities in gaming activities. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. video poker game) is provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play that utilizes operations of providing a feature with multiple chances of using an awarded modifier in gaming devices. In one embodiment, a gaming device includes a display, and a processor configured to execute operations that include facilitating participation in a first gaming event and determining if a bonus feature is triggered during the first gaming event. When the feature is triggered, the operations further include determining an awarded modifier, and determining if the modifier is to be used in the first gaming event based on whether a predefined condition is satisfied. If the awarded modifier is not used in the first gaming event, the modifier is then applied in a second, subsequent gaming event.

Numerous variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve reel-based slot machine examples of this concept, other embodiments include application of these inventive techniques in other types of poker games, slot games, or other games of chance. Some of these other types of embodiments will be discussed below as variations to the examples illustrated. However, many other types of games can implement similar techniques and fall within the scope of this inventive concept.

Referring to the example gaming apparatus 100 shown in FIG. 1, the gaming apparatus includes cabinet structure 101, a display area 102 (also referred to as a gaming display), and a player interface area 104, although some or all of the interactive mechanisms included in the user interface area 104 may be provided via graphical icons used with a touch screen in the display area 102 in some embodiments. The cabinet structure 101 may house various components of the gaming apparatus 100 and may be structured to be used in casinos or other gaming establishments. The cabinet structure 101 may further include one or more physical locks or locking mechanisms to secure the circuitry and other components housed in the cabinet structure. The display area 102 may include one or more game displays 106 (also referred to as "displays" or "gaming displays") that may be included in physically separate displays or as portions of a common large display. Here, the game display 106 includes a primary game play portion 108 that displays game elements and symbols 110, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity. In video poker embodiments, for example, the user interface 104 may include five physical buttons that correspond to displayed card positions and allow a player to hold (or un-hold) particular cards in a draw poker hand. The user interface 104 may also include a physical “Deal/Draw” button that allows a player to initiate a new game by having cards dealt to the card positions or draw replacement cards after having the opportunity to hold any of the dealt cards. In other poker games, keno games, slot games, or other games of chance different button panels or configurations may be used.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player loyalty information to identify a user or player of the gaming device. This mechanism may be card reader, biometric scanner, keypad, or other input device. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The game display 106 in the display area 102 may include one or more of an electronic display, a video display, a mechanical display, and fixed display information, such as paytable information associated with a glass/plastic panel on the gaming machine 100 and/or graphical images. The symbols or other indicia associated with the play of the game may be presented on an electronic display device or on mechanical devices associated with a mechanical display. Generally, the display 106 devotes the largest portion of viewable area to the primary gaming portion 108. The primary gaming portion 108 is generally where the visual feedback for any selected game is provided to the user. The primary gaming portion 108 may render graphical objects such as cards, slot reels, dice, animated characters, and any other gaming visual known in the art. The primary gaming portion 108 also typically informs players of the outcome of any particular event, including whether the event resulted in a win or loss.

In some of the example embodiments illustrated herein, the primary gaming portion 108 may display a grid (or equivalent arrangement) of playing cards 110 forming a hand. Here, the grid includes a row of five playing cards 110 forming a video poker hand, which represents a portion of a game play event. For example, if the game play event is a video draw poker game, the gaming device 100 may deal five cards, allow the user to select which cards to hold, deal replacements for the cards not held, and determine a payout based on the final cards in the hand. The illustration and description of five-card-draw poker is for purposes of example and not of limitation; the present invention may be applicable to numerous other card games, such as stud poker or hold ’em poker, as well as other types of gaming activities and apparatuses, such as slot machines, dice, coins, etc.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual cards for holding prior to draw of new cards. The game display 106 of the display area 102 may include other features that are not shown, such as paytables, navigation controls, etc.

In other example embodiments, the primary gaming portion 108 may display a grid (or equivalent arrangement) of game elements or game element positions (also referred to as “reel stop positions” herein). Although not shown in FIG. 1, the grid may include three rows and five columns of game elements, which may form a game outcome of a game play event from which prizes are determined. In some slot machine examples, each column may display a portion of a game reel. The game reels may include a combination of game symbols in a predefined order. In mechanical examples, the game reels may include physical reel strips where game symbols are shown in images fixed on the reel strips. Virtual reel strips may be mapped to these physical reel positions shown on the reel strips to expand the range or diversity of game outcomes. In video slot examples, reel strips may be encoded in a memory or database and virtual reels may be used for the game reels with images representing the data related to the reel strips. In other slot machine embodiments, each reel stop position on the grid may be associated with an independent reel strip. In yet other slot machine embodiments, reels and/or reel strips may not be used at all in determining the symbols shown in the game element positions of the grid. For example, a symbol may be randomly selected for each game element position, or the symbols may be determined in part by game events occurring during game play, such as displayed elements being replaced by new game elements or symbols. Numerous variations are possible for implementing slot-type game play.

Figure 2:
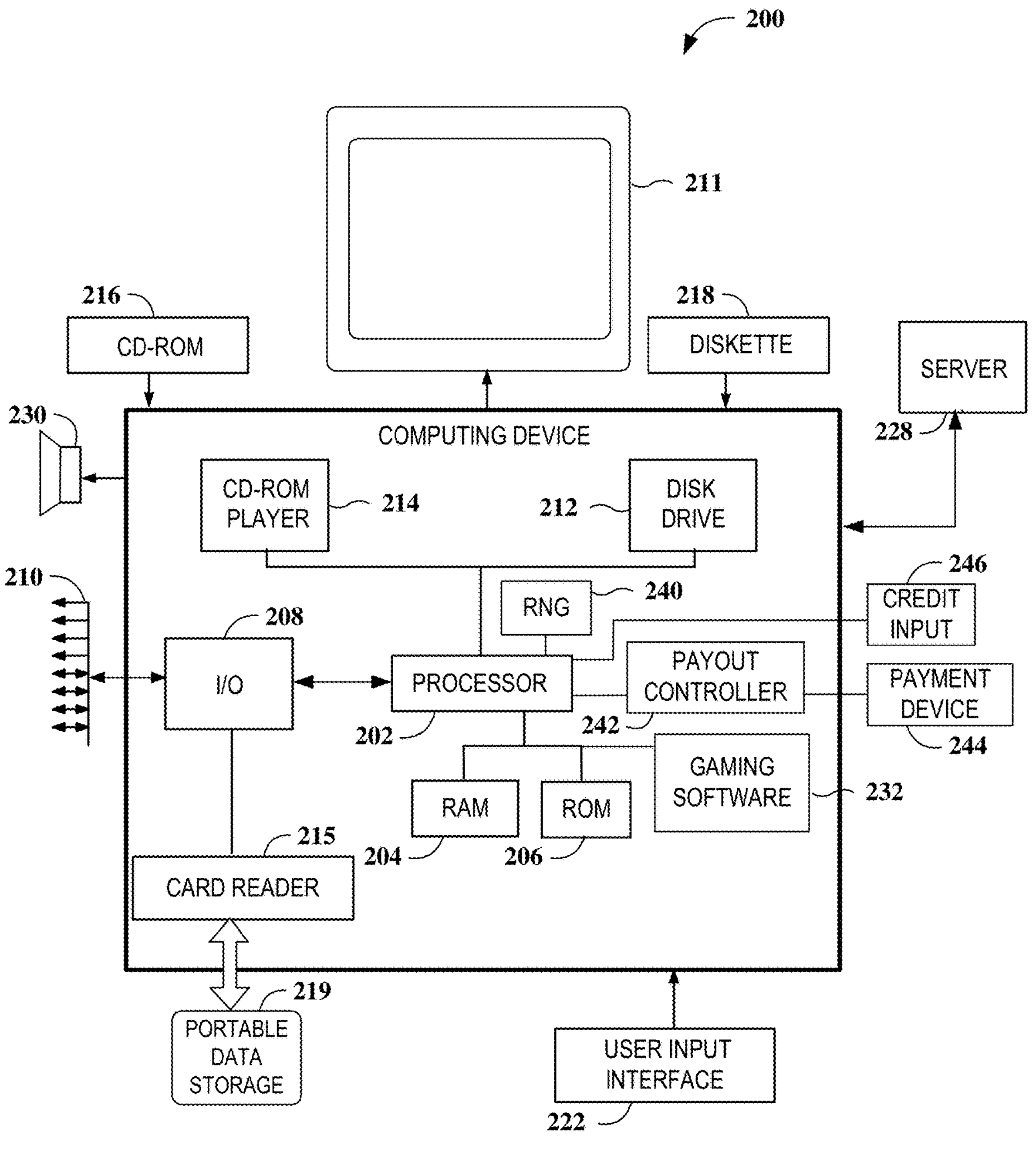
FIG. 2 is a is a block diagram illustrating a computing arrangement according to embodiments of the invention.

Although FIG. 1 illustrates a particular implementation of some of the embodiments of this invention in a casino or electronic gaming machine (“EGM”), one or more devices may be programmed to play various embodiments of the invention. The present invention may be implemented, as shown in FIG. 1, as a casino gaming machine or other special purpose gaming kiosk as described herein, or may be implemented via computing systems operating under the direction of local gaming software, and/or remotely-provided software such as provided by an application service provider (ASP). Casino gaming machines may also utilize computing systems to control and manage the gaming activity, although these computing systems typically include specialized components and/or functionality to operate the particular elements of casino gaming machines. Additionally, computing systems operating over networks, such as the Internet, may also include specialized components and/or functionality to operate elements particular to these systems, such as random number generators. An example of a representative computing system capable of carrying out operations in accordance with the invention is illustrated in FIG. 2.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 200 of FIG. 2 is an example computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions in accordance with the present invention typically includes a central processor (CPU) 202 coupled to random access memory (RAM) 204 and some variation of read-only memory (ROM) 206. The ROM 206 may also represent other types of storage media to store programs, such as programmable ROM (PROM), erasable PROM (EPROM), etc. The processor 202 may communicate with other internal and external components through input/output (I/O) circuitry 208 and bussing 210, to provide control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to the display 211, which represents a display on which the gaming activities in accordance with the invention are presented. The display 211 represents the "presentation" of the game information in accordance with the invention, and may be a mechanical display showing physical spinning reels, a video display, such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, or inputting data to identify a player for a player loyalty system. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs may be implemented using hardware, software operable in connection with the processor 202, or some combination of hardware and software. The present invention is operable using any known RNG, and may be integrally programmed as part of the processor 202 operation, or alternatively may be a separate RNG controller 240. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 indicating a payout is to made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout device 244 may also be provided in gaming machine embodiments, where the payout device 244 serves as the mechanism providing the payout to the player or participant. In some embodiments, the payout device may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency. In yet other embodiments, the payout device 244 may send a signal via the network server 228 or other device to electronically provide a credit amount to an account associated with the player, such as a credit card account or player loyalty account. The computing arrangement 200 may also include accounting data stored in one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, etc., for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payout device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described hereinabove. For example, the software 232 may present, by way of the display 211, representations of symbols to map or otherwise display as part of a slot based game having reels. However, in other embodiments, the principles of this concept may be applied to poker games or other types of games of chance. One or more aligned positions of these game elements may be evaluated to determine awards based on a paytable. The software 232 may include instructions to provide other functionality as known in the art or as described and shown herein.

Embodiments of the present invention set forth systems, apparatuses and methods for providing a feature in gaming devices with multiple chances of using an awarded modifier. Accordingly, a gaming device can include a display, and a processor configured to execute operations that include facilitating participation in a first gaming event and determining if a bonus feature is triggered during the first gaming event. When the feature is triggered, the operations further include determining an awarded modifier, and determining if the modifier is to be used in the first gaming event based on whether a predefined condition is satisfied. In some embodiments, if the awarded modifier is not used in the first gaming event, the modifier is then applied in a second, subsequent gaming event. In other embodiments, the award modifier is automatically used in one or more subsequent gaming events.

The determination of whether the bonus feature is triggered can be implemented in a variety of manners in different embodiments. In some embodiments, a random determination may be used in deciding whether the bonus feature is triggered. For example, a random number may be generated by a random number generator and compared to a predefined threshold, table, or other construct to see if the bonus feature is triggered. In other embodiments, the occurrence of a trigger event during the first gaming event may cause the bonus feature to be triggered. For example, if a particular game symbol, card, type of game outcome (e.g., winning game outcome), award, or other trigger event was displayed or otherwise occurred during the first gaming event, the bonus feature may be triggered. In yet other embodiments, the bonus feature may be triggered in part or whole on the status or action of a current player on the gaming device. For example, the feature may be triggered after receiving 10 (or other number) consecutive losing outcomes, or the feature may be triggered if a player having a particular number of loyalty points plays 50 (or another number) games on the gaming device. In short, many triggering possibilities exist in different embodiments for triggering the bonus feature.

The bonus feature may further be implemented in a variety of manners depending on the embodiment implemented on a particular gaming device. For example, the bonus feature may include rolling one or more dice and associating an outcome of the dice roll with a multiplier value. In another example, the bonus feature may include one or more bonus wheels with credit values and/or multipliers that can be used as award modifiers. In another example, a pick bonus may be used as the bonus feature where the awarded modifier is based on one or more selections made in the pick bonus.

According to some embodiments, the result of the bonus feature may be a modifier that can be used to modify outcomes or awards during gaming events on the gaming device. Here, there may be multiple chances to use the awarded modifier. The modifier may be a credit value that is added to any awards (if any) that are associated with an outcome of a gaming event. The modifier may be a multiplier value that multiplies an awards (if any) that are associated with an outcome of a gaming event. Alternatively, the modifier may otherwise modify an outcome of a gaming event, such as by providing an extra game symbol, an extra playing card, a free re-spin of one or more game reels, nudging one or more game reels up or down, making one or more game symbols “wild symbols,” adding a credit or multiplier value to one or more game symbols occurring on the game display, or otherwise modify the outcome or awards associated with a gaming event.

As discussed above, embodiments of this concept allow multiple chances to use an awarded modifier. When a first chance to use the modifier occurs (such as with the gaming event where the bonus feature was triggered, or with a next gaming event after the gaming event where the bonus feature was triggered), the processor may automatically determine if the awarded modifier is to be applied based on a condition, or a player may have the ability to choose whether to use the modifier. In some embodiments, the condition where the awarded modifier is to be applied may relate to whether the modifier could improve an award (if any) of the gaming event associated with the first chance the modifier can be used. For example, if a first gaming event does not result in a winning outcome, and hence no award, a multiplier modifier may not help or improve the outcome or award of the first game. Thus, in this example, the condition would not be satisfied, and the multiplier modifier may be saved and used in subsequent gaming event. In other embodiments, the condition may relate to the symbols or cards themselves in a first gaming event, a random determination, whether a signal has been received indicating a player's desire to the use the modifier, a particular game metric (such as games played, etc.), or other predefined conditions or criteria. In yet other embodiments, the modifier may be automatically used in one or more subsequent gaming events regardless of whether or not it was used in the first gaming event.

In some embodiments, if the awarded modifier is not used during the first chance, the modifier is automatically used in the next gaming event, regardless of whether the modifier satisfies a similar condition that was used to determine if the awarded modifier would be used during the first chance. In other embodiments, the awarded modifier is only used in subsequent chance or opportunity when it satisfies a second condition. The second condition may be the same or substantially similar to the condition (first condition) used during the first chance to use the awarded modifier, or the second condition may be different than this first condition. In yet other embodiments, the awarded modifier may not be used until a signal is received indicating that a player wants to use the awarded modifier.

Each chance to use a modifier may be during a separate gaming event that necessitates independent wagers from one another. For example, if a bonus feature is triggered during a first gaming event, the awarded modifier from the bonus feature may be used during that first gaming event if a condition is satisfied. If the condition is not satisfied during the first gaming event, the modifier may be implemented on a second gaming event after the placement of another wager. In other embodiments, each chance to use the modifier may be part of the same wagered-on gaming event. For example, each chance may relate to a free game or spin during a free spin bonus, where for example, 10 free spins are awarded and the modifier is available on each free spin until it is used on a free game that results in an award above a predefined threshold.

In one example embodiment, a primary or base game may be a poker game where a die/dice feature multiply is triggered randomly or by an aspect of the result of a current poker game. Here, the method includes receiving signals from the user interface to place a wager on a first poker game and determining with the processor if a bonus dice feature is triggered. If the bonus dice feature is triggered, the game then determines a dice value outcome and associates the dice value outcome with a bonus multiplier. If the first poker game results in a winning hand that is associated with an award from a paytable, the bonus multiplier is used to multiply the award determined in the first poker game.

If, however, the first poker game does not result in a winning hand, the bonus multiplier is not used in the first poker game and may then be used in a second poker game. Here, when the second poker game is played, the game outcome for the second poker game is modified by the bonus multiplier from the bonus dice feature. In some embodiments, the bonus multiplier is applied in the second poker game regardless of what happens during the second poker game and then goes away. In other embodiments, the bonus multiplier may continue to be available in a third poker game if it cannot be used in the second poker game. Or, if the bonus multiplier was used in the second poker game, it may continue to be available in a third poker game. Here, the same bonus multiplier may be used or another dice roll may be performed to determine another bonus multiplier for use in modifying the outcome of the third poker game. In this embodiment, the bonus dice feature may continue until a termination condition is activated. In the separate trigger embodiment, a determination may be made within each game as to whether a dice feature is triggered to determine a bonus multiplier for use with a subsequent poker game.

In another example embodiment, regardless of whether the first poker game results in a winning hand, the bonus multiplier is used in a second poker game. Here, when the second poker game is played, the game outcome for the second poker game is modified by the bonus multiplier from the bonus dice feature. In some embodiments, the bonus multiplier may be further used in a third poker game. In some embodiments, the bonus multiplier may be used in poker games until it is used to multiply a winning poker hand or until a different termination condition is activated.

In another representative variation, multiple hands of poker are presented as a primary game where a die/dice feature is used to multiply or modify at least one of the multiple poker hands when the die/dice feature is triggered. In other multi-hand embodiments, each of the multiple poker hands may be associated with a separate bonus modifier. Hence, in a five-play poker game, five different bonus modifiers may be active. These bonus modifiers may be used on a respective poker hand during the current poker game or be available on the same respective poker hand during a subsequent poker game.

FIGS. 3A-3J are detail diagrams of a game display illustrating a game progression according to embodiments of the invention. The example game progression shown in FIGS. 3A-3J includes a multi-chance dice bonus feature that is randomly triggered during a poker gaming event. Dice outcomes are associated with bonus multiplier awards that are saved and used to modify any awards won in the base game of the poker gaming event or a subsequent poker gaming event. Although this example progression includes a random trigger for the dice bonus feature, other embodiments may include a feature trigger based on a card received in the dealt poker hand, based a card received in the final poker hand, based on a type of poker hand received, based on a mystery "lucky coin" determination, or based on other types of triggering events. In this example progression, the dice feature is played prior to the display of the initial deal of virtual playing cards in the current poker game, but may, in other embodiments, occur after a final poker hand is shown in the current poker game, during play of the current poker game, or at any other time between the initiation of the current poker game and the completion of the current poker game. Additionally, in this example game progression, a number of dice used in the dice bonus feature is randomly selected prior to rolling the selected dice. This feature may be based on a weighted table or otherwise skewed so that the dice bonus feature is more likely to have a certain number of dice, as well as limiting the minimum and maximum number of potential dice. In this present example, the player may receive between one and four dice to roll during the bonus dice feature. The result of the dice roll is directly associated with a multiplier that is used to modify any awards won in the next poker game played. Each game will include a determination if a dice feature is triggered to provide a multiplier for the following poker game.

Referring to FIG. 3A, a game display 300 includes a poker hand 310 that is played using five card draw poker rules. A dice bonus feature is triggered prior to the initial deal of a poker hand 310. Here, a random number is identified, and the bonus feature is triggered if the identified random number falls within a predetermined range. As shown in FIG. 3A, the initial poker hand has not yet been dealt, but a triggering condition for the bonus feature has been satisfied, and a bonus message 312 is shown to the player on the game display 300. After the bonus has been triggered, a bonus roll zone 320 (or bonus display 320), a dice start area with one or more dice 325, and a multiplier meter 307 become active for determining a multiplier for the next poker base game, as shown in FIG. 3B. In this instance, after the dice feature has been triggered, a random selection determines that a single die will be used in this dice bonus feature. The player may activate the dice 325 by swiping their finger across the display screen 300 to mimic rolling the dice toward the roll zone 320.

Referring to FIG. 3C, the die 325 has been activated and moves to the roll zone 320 where is lands so that a value of “5” is displayed. This outcome is associated with a multiplier of “5×,” which is displayed in the multiplier meter 307. In FIG. 3D, the initial poker hand was dealt, the player held the King of Spades and a draw of the remaining four cards has occurred to show the final cards in the poker hand 310. As the final poker hand included a pair of Kings with a 5 credit award according to the paytable (shown in FIG. 3A) was to be awarded. However, since the feature was triggered, the 5 credit award was multiplied by the “5×” multiplier shown in the multiplier meter 307 for a final award of 25 credits. A second poker game wagered on by the player (and shown in FIG. 3E) does not have a multiplier to modify any awards won during the game. In this second game, the player has won two pair with an award of 10 credits. The player plays a third poker game (shown in FIG. 3F) again without a bonus feature being triggered and is paid 30 credits for a flush.

However, upon initiation of the fourth poker game (shown in FIG. 3G), a bonus feature has again been triggered, as shown by the bonus message 312. In this instance, it is determined that the player will roll three dice (325A, 325B, and 325C) for a bonus multiplier. As shown in FIG. 3H, the bonus feature resulted in the three dice (325A, 325B, and 325C) showing a “4,” a “3,” and another “4” for a total of 11, which is associated with the “11×” multiplier shown in the multiplier meter 3207. The result of the fourth poker game is FIG. 3I. Here, the player did not receive a winning poker hand. However, as this embodiment allows a player to maintain a bonus multiplier value until it is used to multiply an award associated with a poker hand, the player maintains the “11×” multiplier for use on the fifth poker hand. The result of the fifth poker hand is shown in FIG. 3J. Here, the player has received a full house outcome on the final poker hand. The 45 credits normally associated with a full house outcome is multiplied by the “11×” multiplier for a total win of 495 credits.

Although the embodiments of FIGS. 3A-3J have the dice associated with multipliers, other modifiers or awards are possible in other embodiments. For example, some or all of the combined dice outcomes may be correlated to credit values, free games/spins/hands, bonus symbols to be used in the base game, or other types of awards. In one example, rolling doubles may be associated with multipliers while rolling other dice combinations may be associated with bonus credits that are won for subsequent poker or slot games. In another example, doubles received on rolls with two dice may be split and re-rolled.

In yet other embodiments, the triggering condition for the bonus feature may include evaluating the current poker hand to determine if the player receives a dice roll for a modifier in the current poker hand and/or the next poker hand. For example, a player may need to receive a winning hand (or a hand above a certain threshold) to be eligible for a dice roll. This may also be used in multi-hand embodiments, where each level or hand of the multi-hand game may be used to determine if the corresponding level or hand of a subsequently-played poker game receives a dice roll for a new multiplier/modifier, or maintains the same multiplier/modifier from the previous game at the same level or hand. For example, in a “Triple-Play” poker embodiment, where the first and third hands have winning final poker hands, the player may get to roll dice prior to playing a multi-hand poker game. However, since the hand at level two (or the second hand) did not result in a win, the second hand or level is not associated with a multiplier or modifier.

Figure 4:
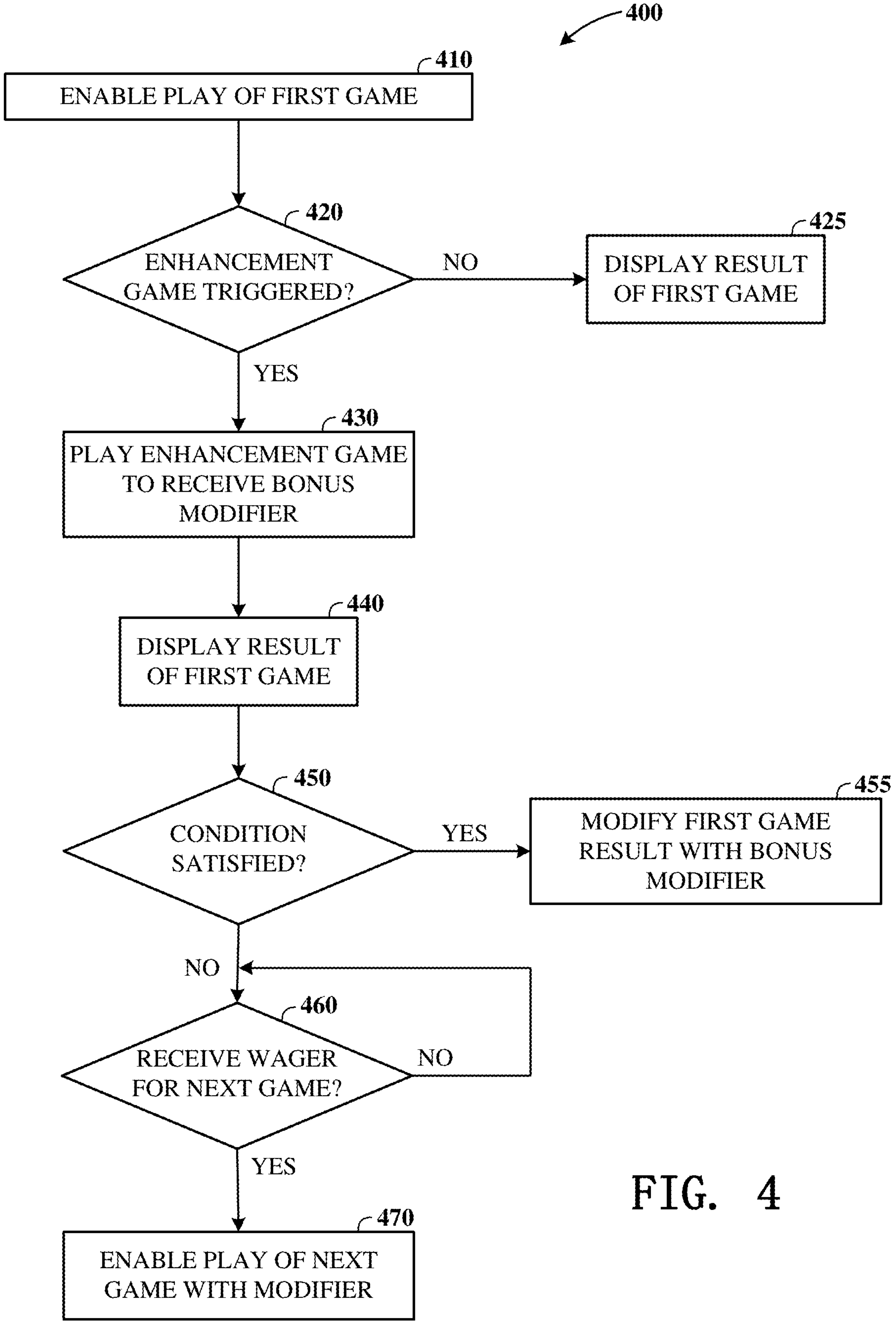
FIG. 4 is a is a flow diagram illustrating processes in a method of operating a gaming device according to embodiments of the invention.
Figure 11:
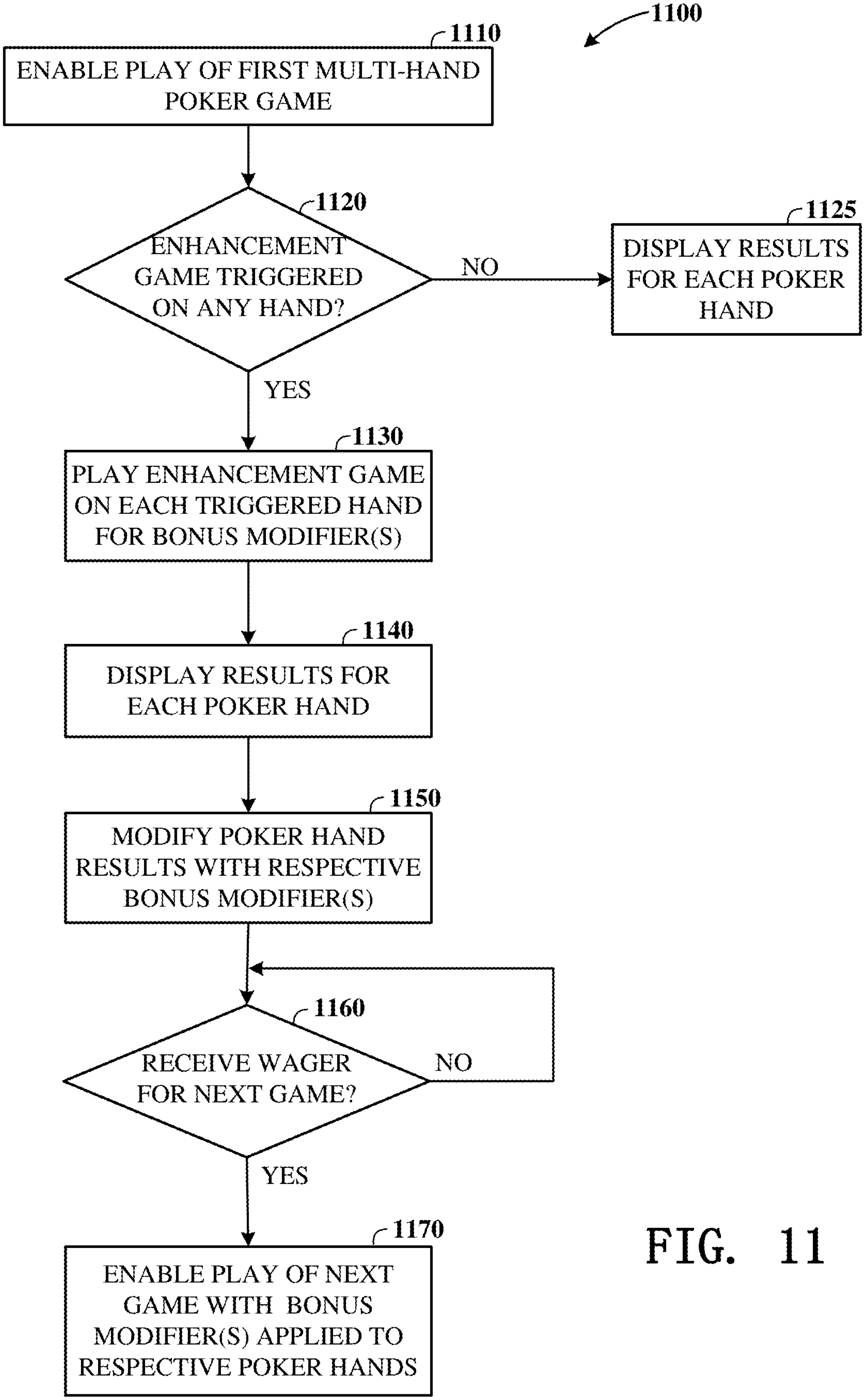
FIG. 11 is a is a flow diagram illustrating processes in a method of operating a gaming device according to embodiments of the invention.
Figure 12:
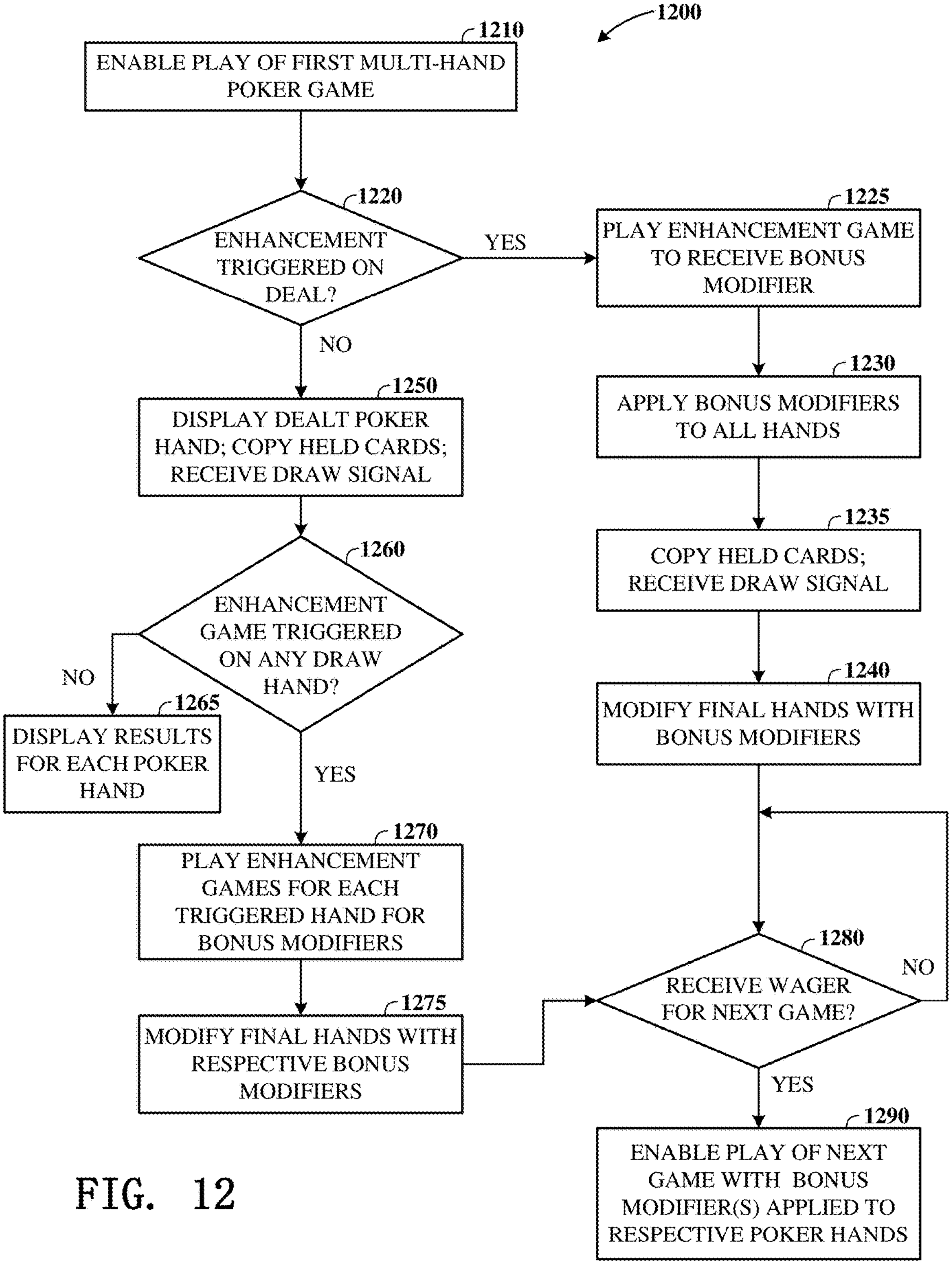
FIG. 12 is a is another flow diagram illustrating processes in a method of operating a gaming device according to embodiments of the invention.

FIGS. 4, 11 and 12 are flow diagrams representing methods in which a gaming device and/or gaming system can be operated according to embodiments of the invention. Although various processes are shown in a particular order in these flow diagram, the order of these processes can be changed in other embodiments without deviating from the scope or spirit of this concept. Hence, the order of the processes shown is for illustrative purposes only and is not meant to be restrictive. Additional game processes may also be included between various processes even though they are not shown in these flow diagrams for clarity purposes. Further each of the processes may be performed by components in a single game device, such as by a game processor, or may be performed in part or whole by a remote server or processor connected to the gaming device via a network. Each process may be encoded in instructions that are stored in a memory, a computer-readable medium, or another type of storage device. Note that these example methods are just some embodiments of how the steps of a game operation can be implemented. As discussed and shown above, many variations exist which may require additional, fewer, or different processes to complete.

Referring to FIG. 4, an operation flow 400 of gaming device may being at process 410 where a first poker game is wagered on and initiated. In process 420, it is determined whether an enhancement game is triggered. As discussed herein, an enhancement game or bonus feature may be triggered based on a variety of criteria in different embodiments. For example, the enhancement feature may be triggered based on a random determination seeded by a random number generator. Alternatively, the enhancement feature may be triggered based on a virtual card being dealt (or drawn) to a poker hand with a subsymbol. In yet other embodiments, the enhancement game may be triggered based on an evaluation of the dealt poker hand or final poker hand. As alluded to above, many other possible triggering criteria may be used in different embodiments. If an enhancement game has not been triggered in process 420, flow 400 proceeds to process 425 where the result of the first poker game is displayed and evaluated. If, on the other hand, an enhancement game was triggered in process 420, flow 400 proceeds to process 430 where the enhancement game is played to determine a bonus modifier. As discussed herein, the enhancement game may include rolling one or more dice, spinning a bonus wheel, or other bonus mechanic that can be used to determine a bonus modifier. The bonus modifier may be a multiplier value, bonus credits, extra cards or game symbols, or other elements that can be used to modify one or more prizes or aspects of gaming events.

In process 440, the result of the first game is displayed. In process 450, it is determined if a modifier-application condition is present. Here, the modifier-application condition may be based on whether the first game result is associated with an award (i.e., a winning game outcome), whether the first game included a specific card, game symbol or another predefined game element, whether a random determination was satisfied during the first game, or based on another type of predetermined condition being satisfied during the first game. If the modifier-application condition was satisfied, the first game result is modified by the bonus modifier in process 455. Here, for example, if the bonus modifier was a multiplier value, that multiplier value may be used to multiply any awards won based on the result of the first game. If the modifier-application condition was not satisfied in process 450, flow 400 proceeds to process 460 where the gaming device waits to receive a wager on a next game. When a next game is wagered on, flow 400 then proceeds to process 470 where the next game is initiated and the bonus modifier won from the first game is applied to this next game. In some embodiments, the bonus modifier may be removed after this next game regardless if it can be used in the next game. In other embodiments, the bonus modifier may be continue to be applied to future games played until it can be used to modify a future game. In still other embodiments, the bonus modifier may be applied over a predetermined (or random) number of future games, or for a set amount of time.

FIGS. 5A-5L are detail diagrams of a game display illustrating a game progression according to embodiments of the invention. The game progression shown in FIGS. 5A-5L is a multi-hand poker game cards are dealt to a bottom poker hand and cards held in this bottom hand are copied to the respective card positions in the other poker hands above this bottom (or main) poker hand. In this embodiment, a bonus feature can be triggered to generate a bonus multiplier with a "second-chance" to it. That is, if a bonus multiplier is won during a first gaming event, it is applied to all of the poker hands in the multi-poker game. If any of those poker hands end up with a final combination of cards (final poker hands) that are associated with awards, the awards are multiplied by the bonus multiplier. However, for any of the final poker hands that are not associated with an award (i.e., not winning poker hands), the bonus multiplier associated with those specific losing hands are kept and applied to the same hand level in the next poker game.

Figure 5A:
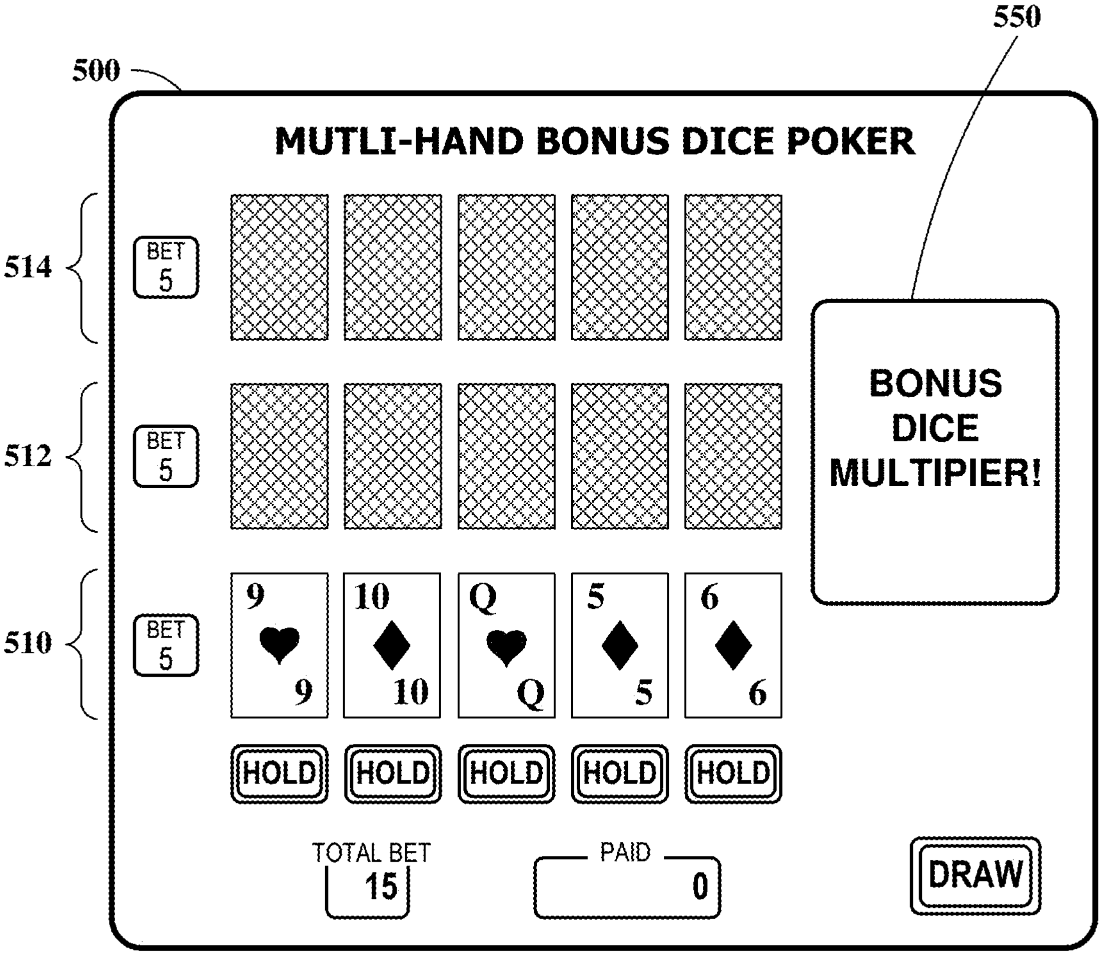
FIGS. 5A-5L are detail diagrams of a game display illustrating a game progression according to embodiments of the invention.
Figure 5B:
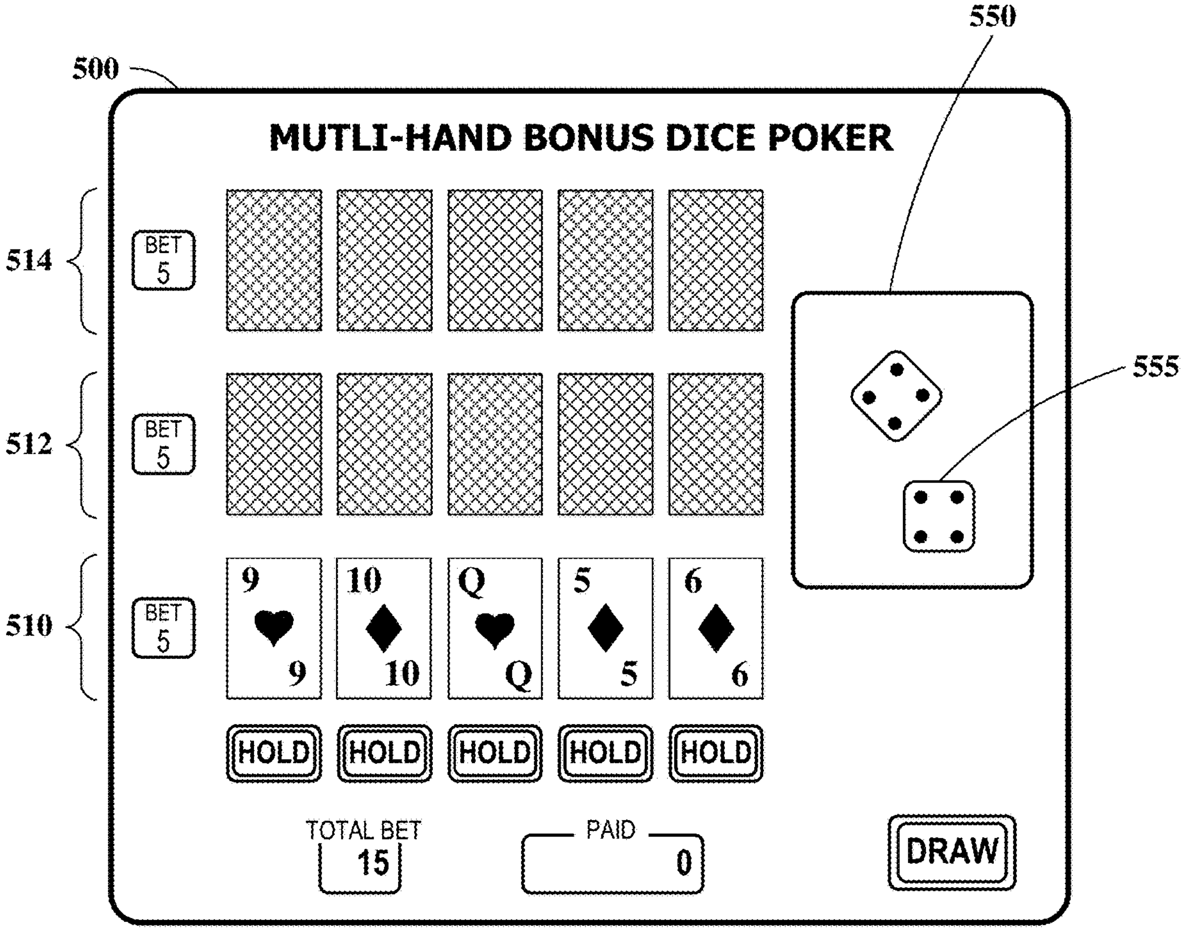
Figure 5C:
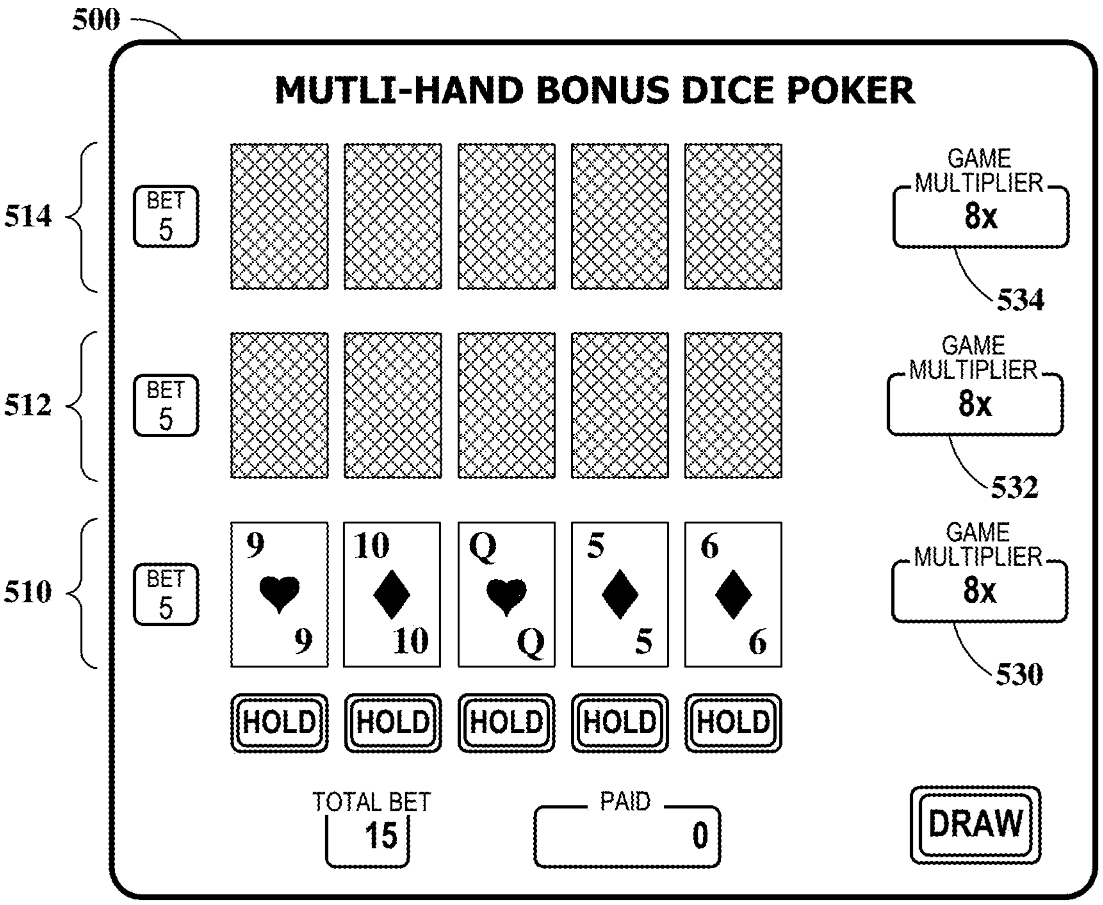
Figure 5D:
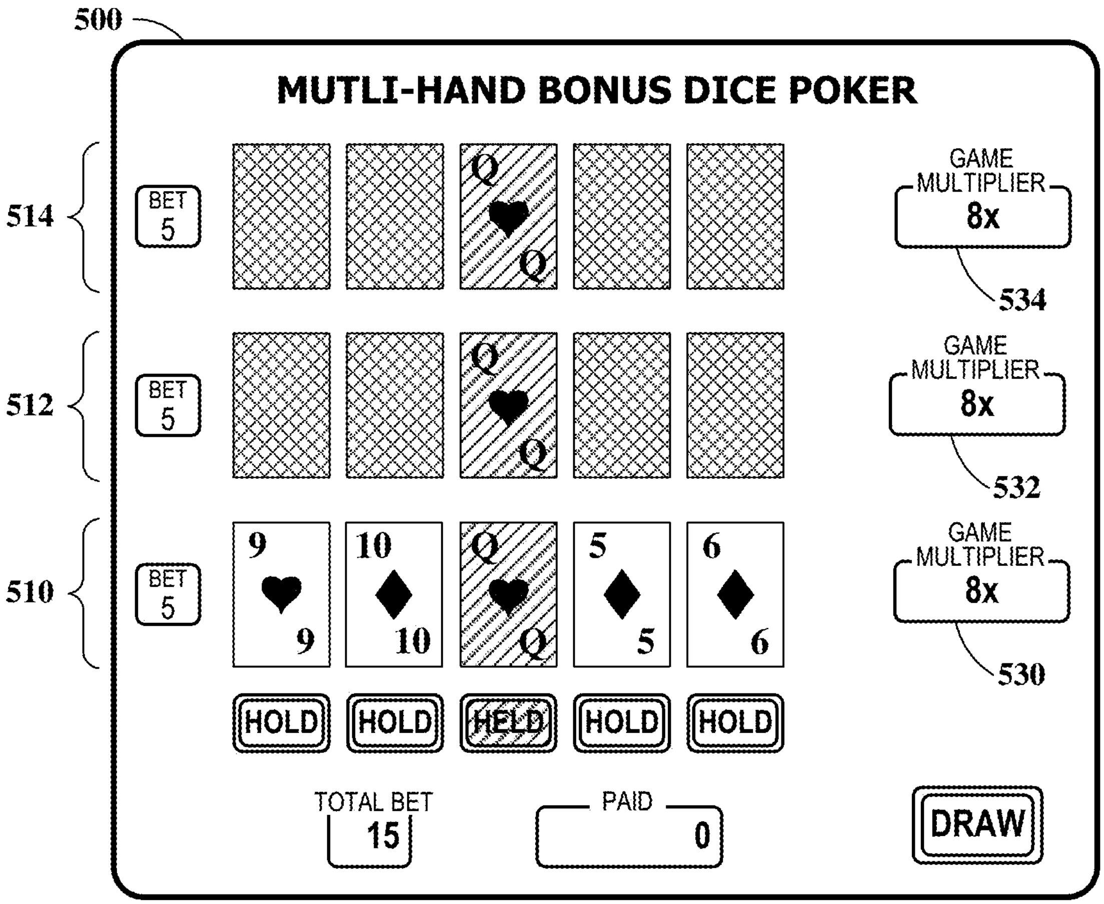
Figure 5E:
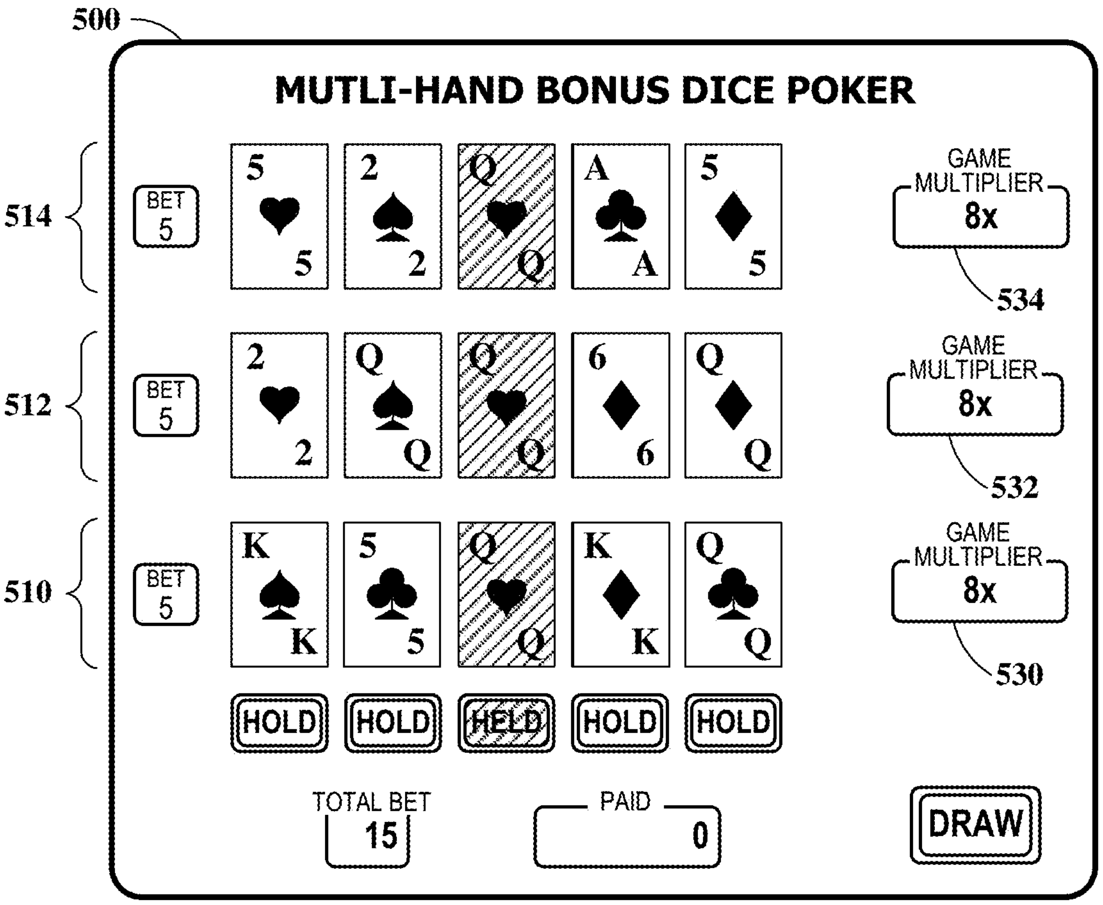
Figure 5F:
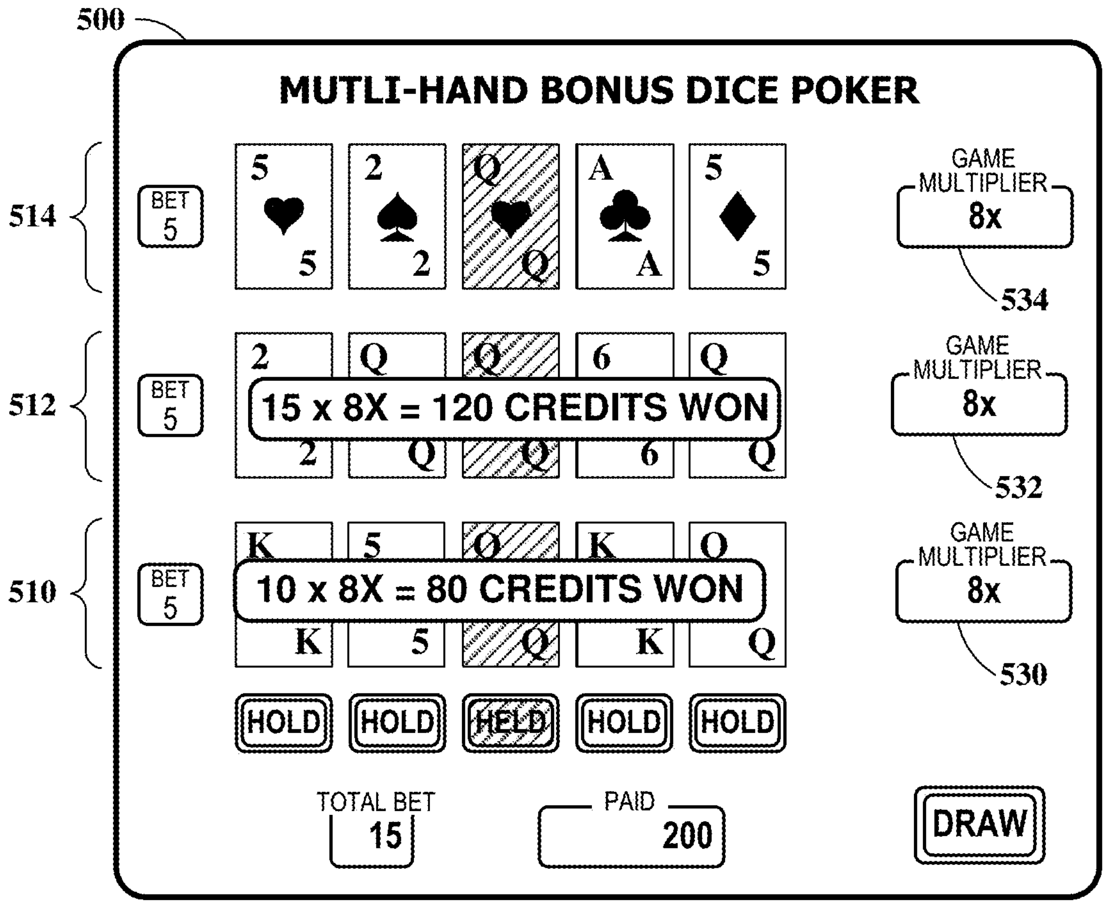
Figure 5G:
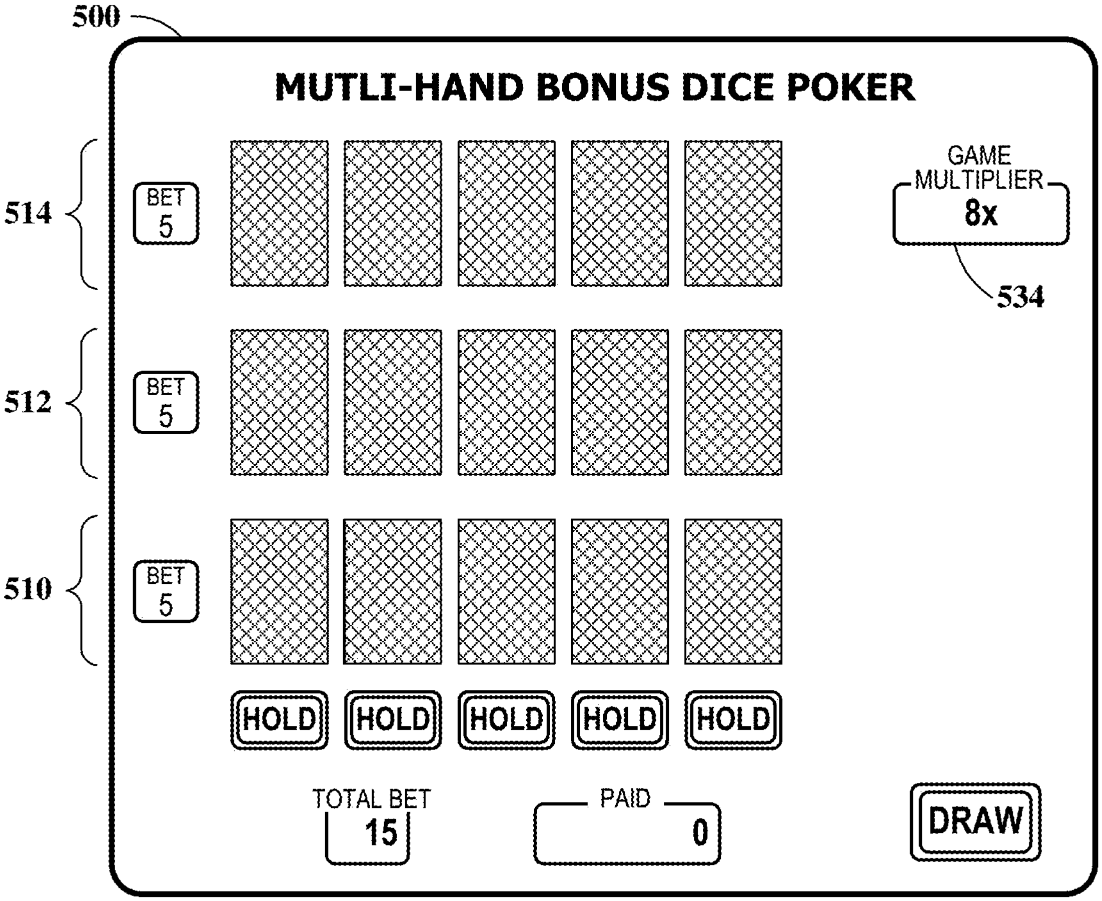
Figure 5H:
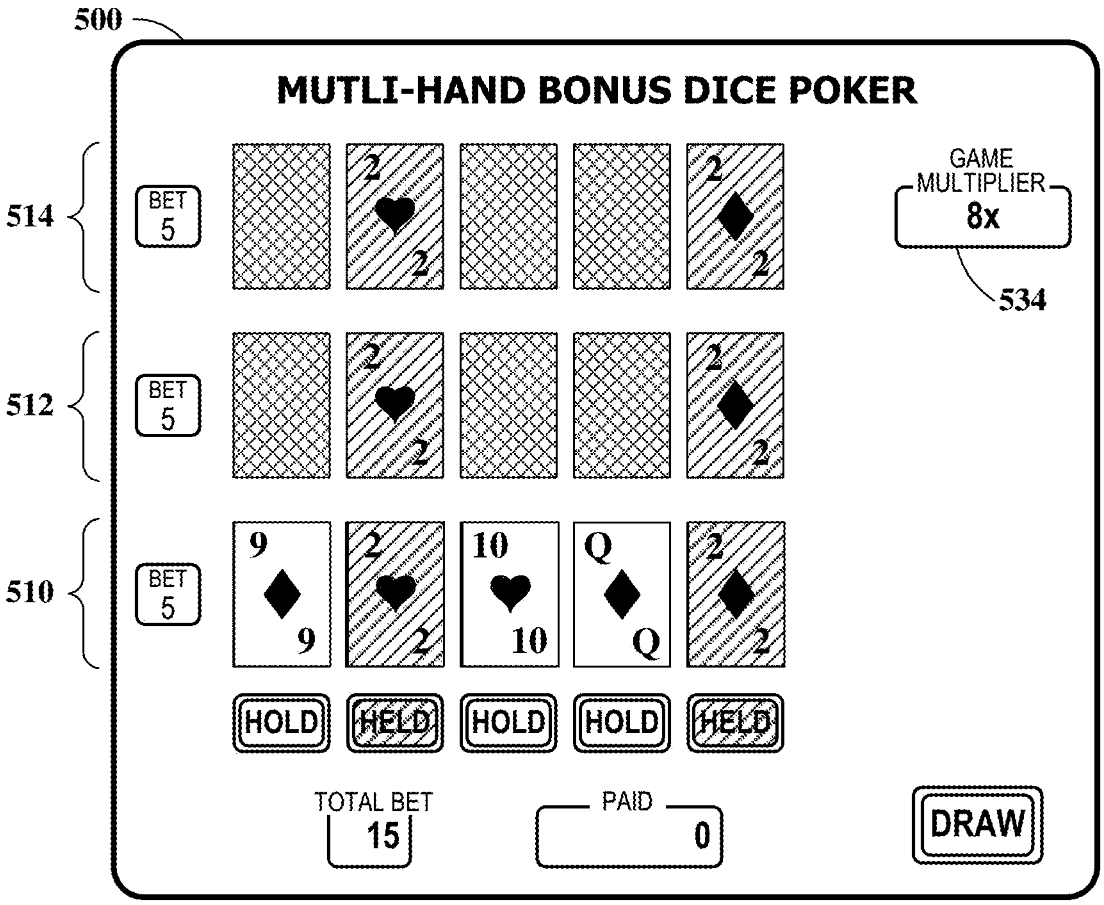
Figure 5I:
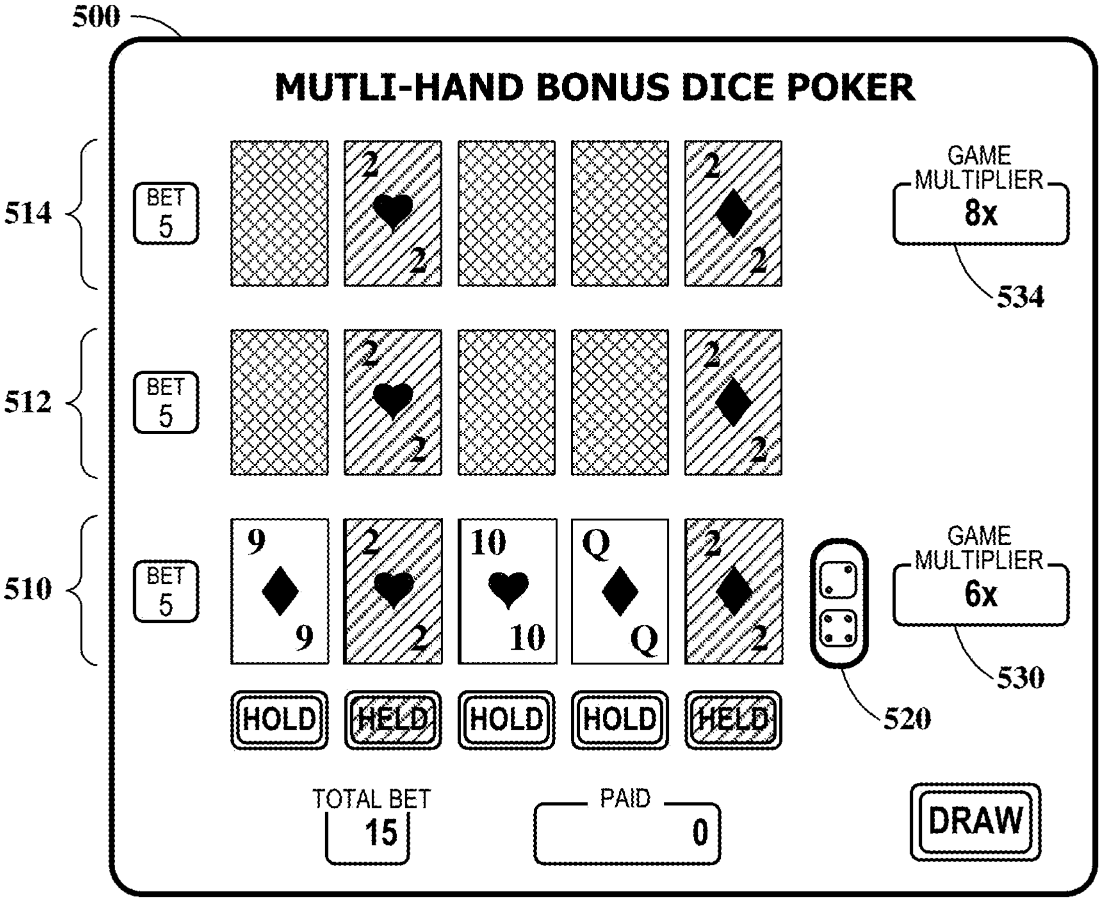
Figure 5J:
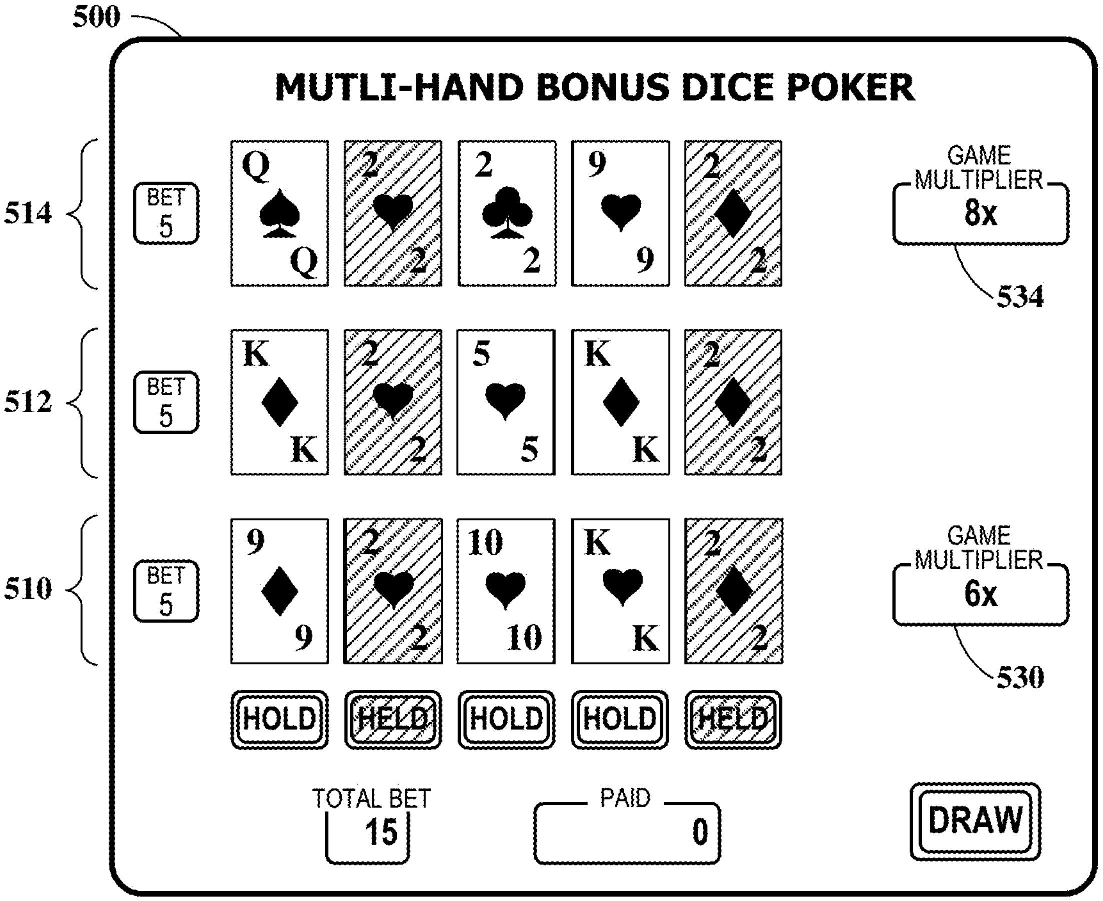
Figure 5K:
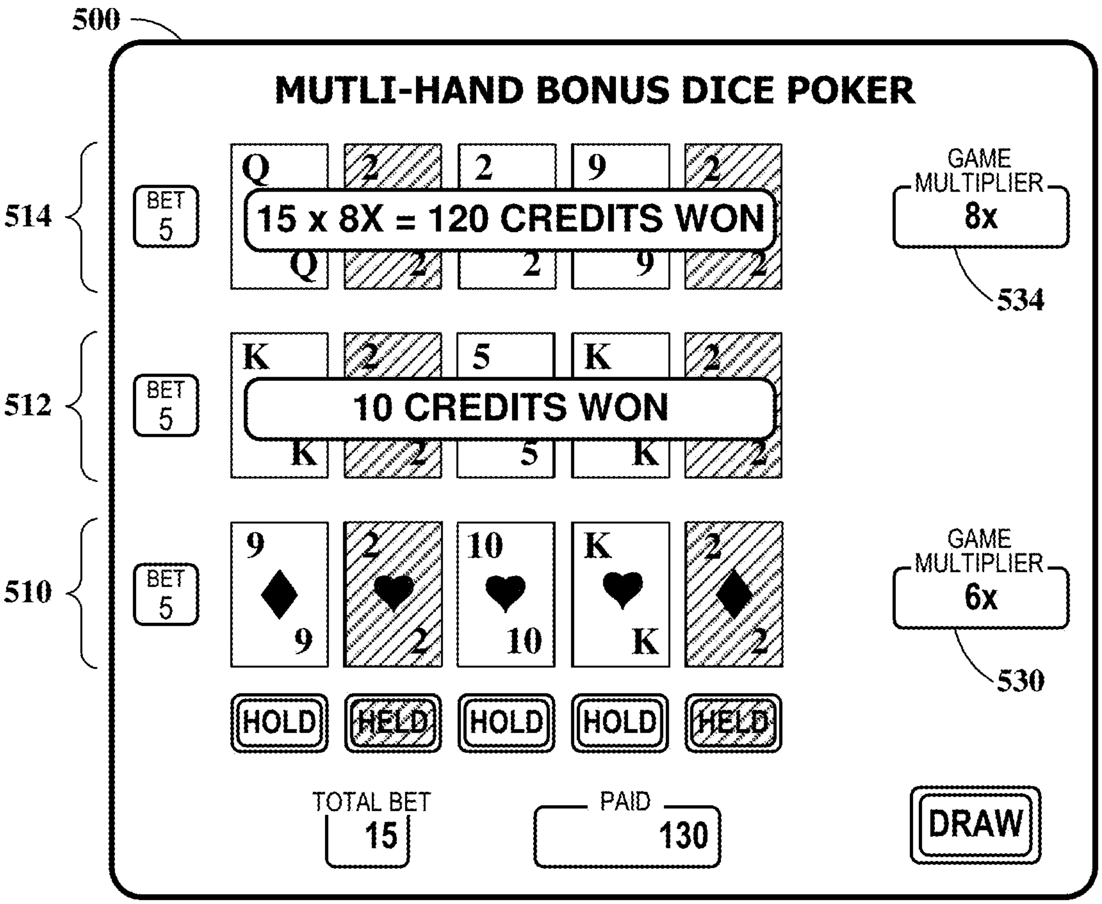
Figure 5L:
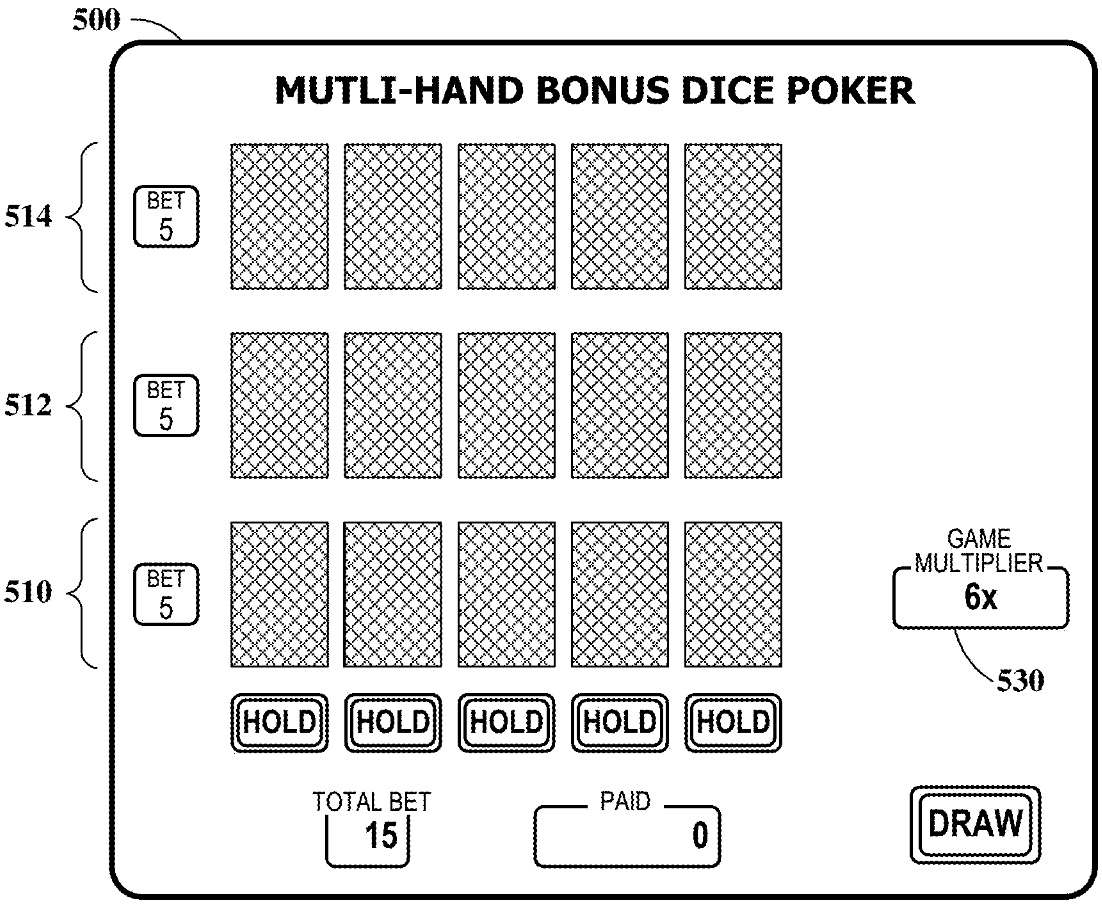

Referring to FIG. 5A, a gaming display 500 shows a three-level multi-hand poker game with a first poker hand 510, a second poker hand 512, and a third poker hand 514. Here, after the initial set of cards is dealt to the first poker hand 510, a bonus feature is triggered as shown by the bonus area 550. In FIG. 5B, the bonus feature is played in the bonus area 550, which in this embodiment is two dice 555 being rolled together. Here, the dice end up both showing the number "4". In this embodiment, the values shown on the dice 555 are added together to give a bonus multiplier value, which in this case would be "8×". In FIG. 5C, this bonus value of "8×" is assigned to each of the three poker hands 510, 512, 514 by being shown in respective game multiplier meters 530, 532, 534. In FIG. 5D, a queen of hearts in the $3^{rd}$ card position is held. In FIG. 5E, replacement cards are drawn for the three poker hands 510, 512, 514. In FIG. 5F, awards are presented for the winning poker hands, where the bonus multipliers associated with the winning poker hands are used to multiply the winnings in these hands. Thus, as shown in FIG. 5F, the Two Pair in the first poker hand 510, which has an initial award of 10 credits is multiplied by the "8×" in the first game multiplier meter 530 for an award of 80 credits, and the Three-Of-A-Kind in the second poker hand 512, which has an initial award of 15 credits is multiplied by the "8×" in the second game multiplier meter 532 for an award of 120 credits. The 80 credits and 120 credits won are combined for a total award of 200 credits for the first poker gaming event. In FIG. 5G, a second subsequent poker game is initiated, where the bonus multiplier for the first poker hand 510 and the second poker hand 512 are removed since they were used in the first poker game, but where the "8×" bonus multiplier for the third poker hand 514 is maintained for the second poker gaming event, as shown in the third game multiplier meter 534. In FIG. 5H, cards are dealt to the first poker hand 510 and cards are held. In FIG. 5I, a bonus feature is triggered on the draw for the first poker hand 510. Here, a bonus multiplier that is only applicable for the hand that it is associated with is determined for the bonus feature triggered on the draw. That is, this bonus feature is hand dependent and is only applied on the hand for which it was triggered as opposed to being applied to all of the poker hands as shown in FIG. 5C where the bonus feature was triggered on the deal. In this case, a bonus area 520 is used to determine a bonus multiplier for the first hand 510 of "6×", which is shown in the first multiplier meter 530. In FIG. 5J, replacement cards are determined for the three poker hands. In FIG. 5K, awards are presented for the winning poker hands in the second poker game, where the bonus multipliers associated with the winning poker hands are used to multiply the winnings in these hands. In FIG. 5L, a third poker game is initiated, where the first bonus multiplier "6×" for the first poker hand 510 that did not have a winning poker hand in the second poker game is maintained for a second chance at being used.

Figure 6A:
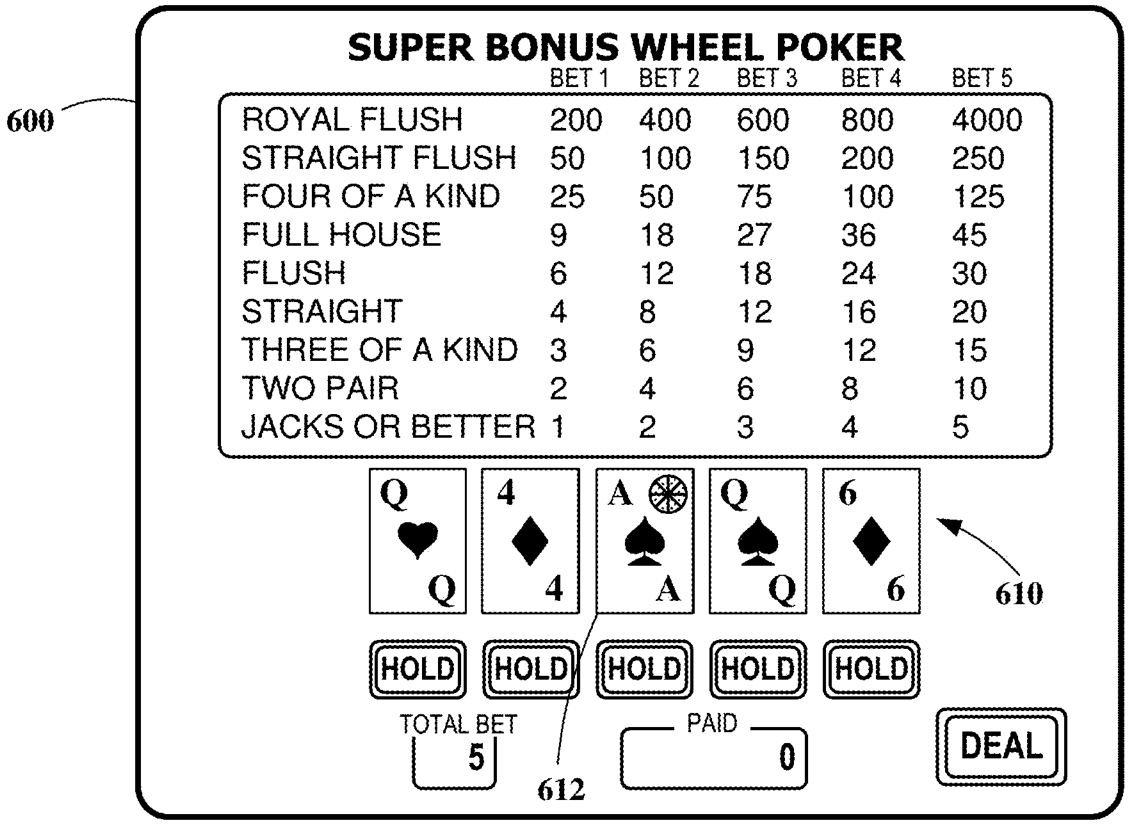
FIGS. 6A and 6B are detail diagrams of a game display illustrating a game progression according to embodiments of the invention.
Figure 6B:
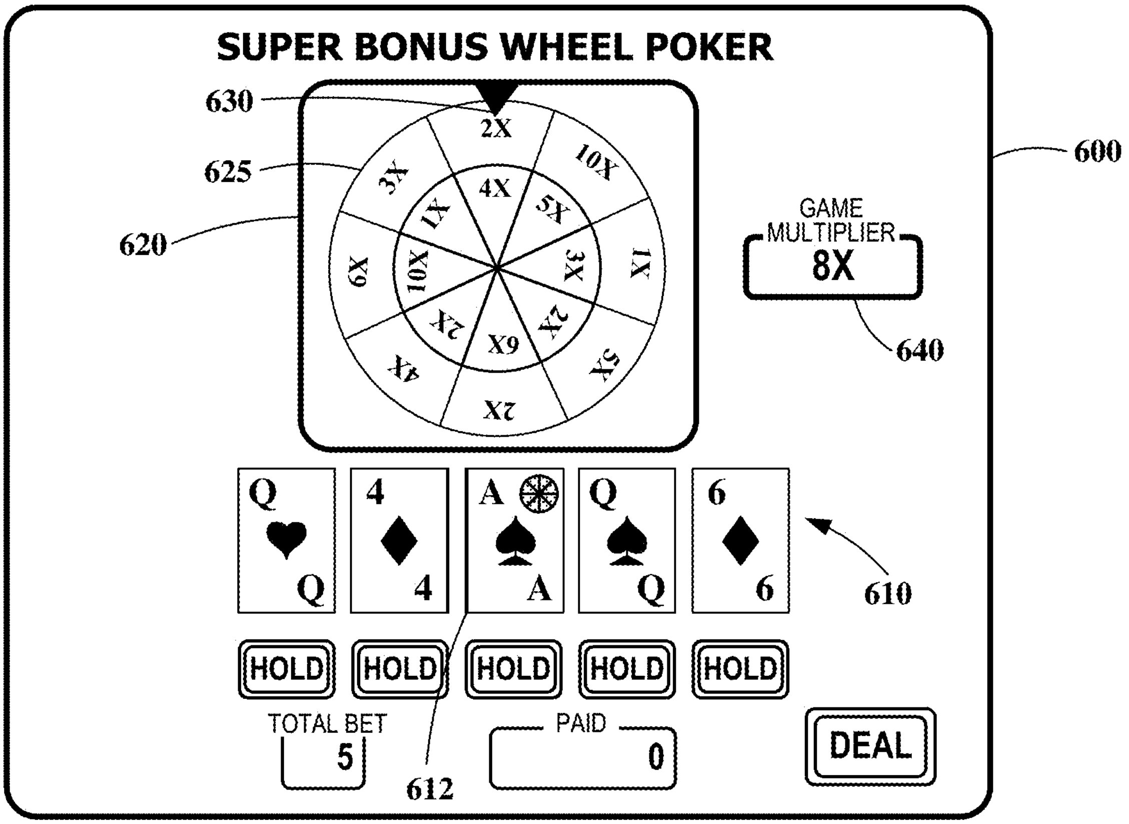

FIGS. 6A and 6B are detail diagrams of a game display illustrating a game progression according to embodiments of the invention. These figures illustrate a bonus feature trigger that can be a subsymbol on a dealt or drawn card in a poker game. Referring to FIG. 6A, a game display 600 shows a poker hand 610 of virtual cards, where one or more of the displayed cards are subsymbol cards 612 that are normal playing cards associated with a bonus subsymbol. In this embodiment, if a subsymbol card 612 is received on the deal or draw, a bonus feature is triggered, as shown in FIG. 6B. Referring to FIG. 6B, a bonus feature is triggered in a bonus area 620 that includes a multi-level bonus wheel 625 with multiplier values on each level of the bonus wheel. Here, each level of the multi-level bonus wheel spin independently and then stop. The sections indicated by the indicator 630 on each level of the bonus wheel are 625 are multiplied together to result in a bonus multiplier, which is shown in the multiplier meter 640.

Figure 7:
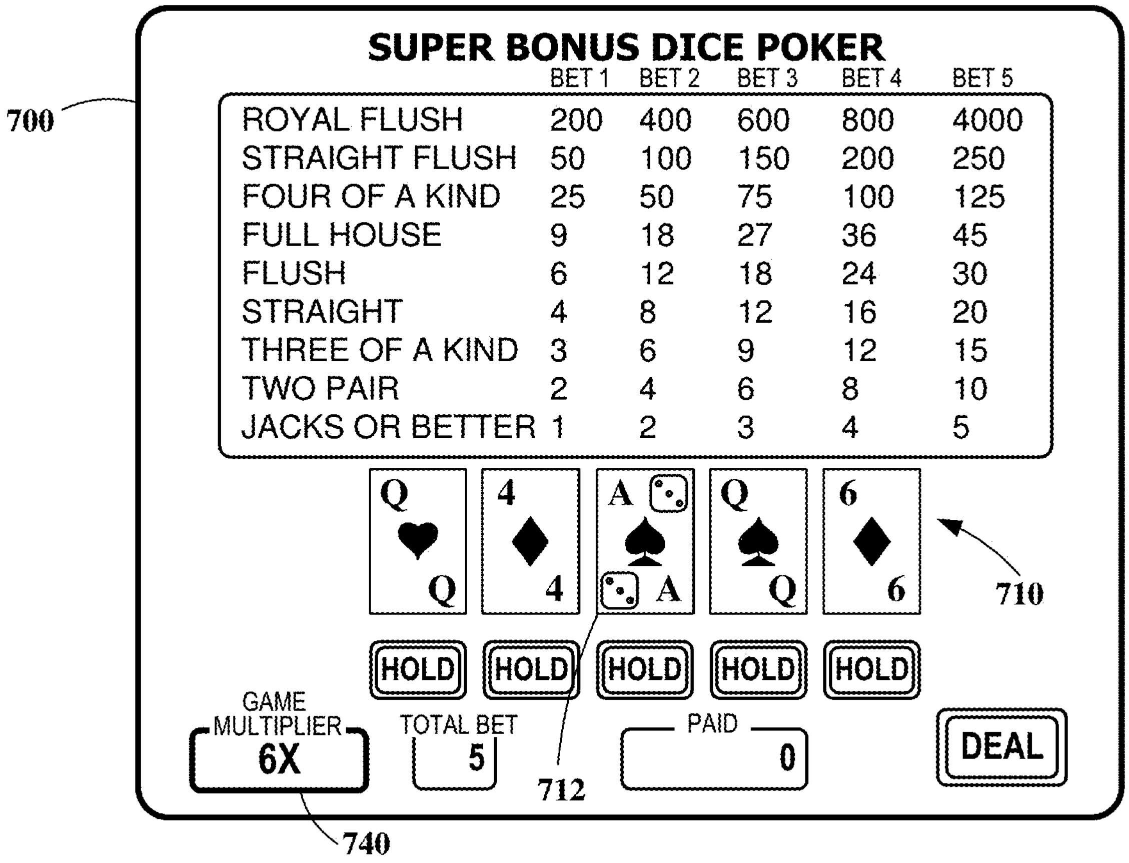
FIG. 7 is a detail diagram of a game display illustrating a game feature according to embodiments of the invention.

FIG. 7 is a detail diagram of a game display illustrating a game feature according to embodiments of the invention. This figure illustrates another embodiment where the result of the bonus feature may be determined and shown as part of the sub-symbol trigger for the bonus modifier. Here, dice subsymbols may be randomized prior to being shown on the game display 700 so that they represent the bonus modifier that is awarded. Referring to FIG. 7, a game display 700 shows a poker hand 710 where one or more of the dealt or drawn cards may be bonus subsymbol cards 712 that show dice subsymbols where the random values of one or more dice are shown as the subsymbol values. In this instance, a bonus subsymbol card 712 is received that includes two dice subsymbols, which each randomly show the value of “3”. These values are summed (or could be otherwise combined) to give a “6×” bonus multiplier values, which is shown in the multiplier meter 740.

Figure 8A:
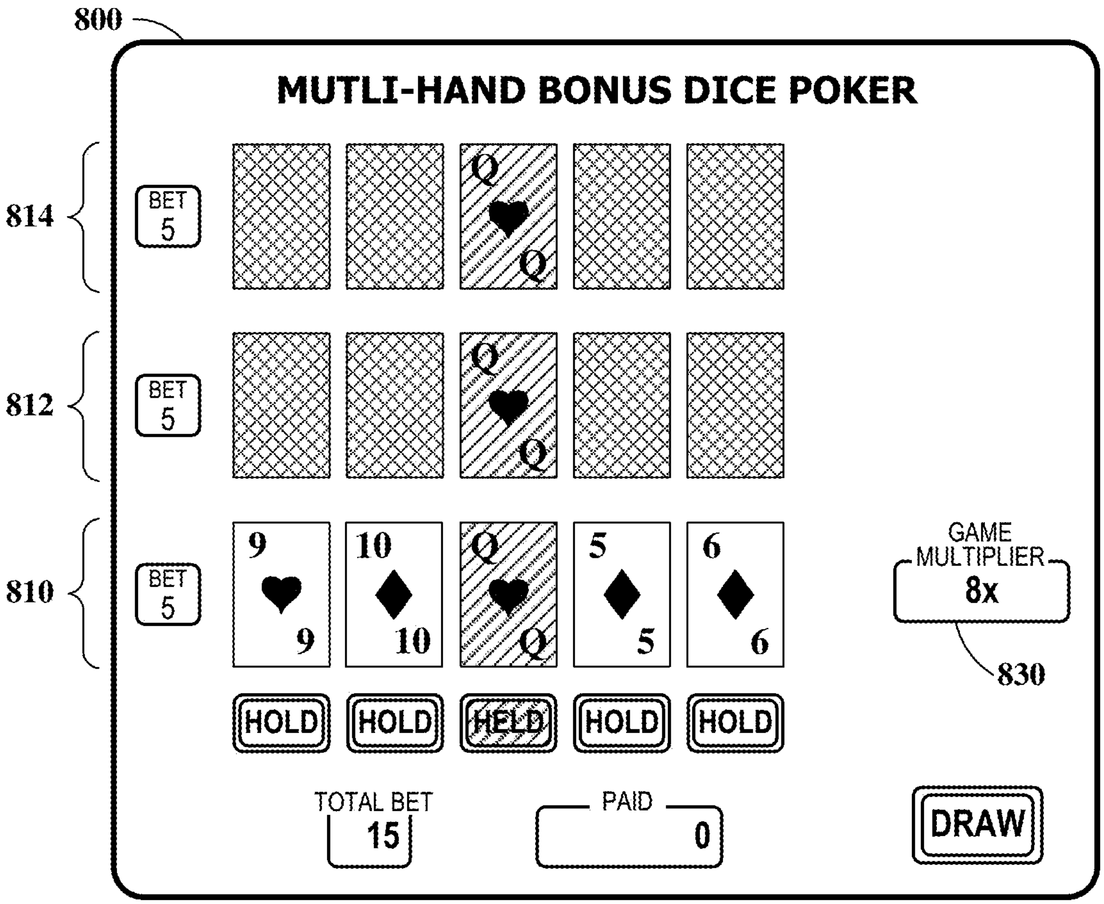
FIGS. 8A-8C are detail diagrams of a game display illustrating a game progression according to embodiments of the invention.
Figure 8B:
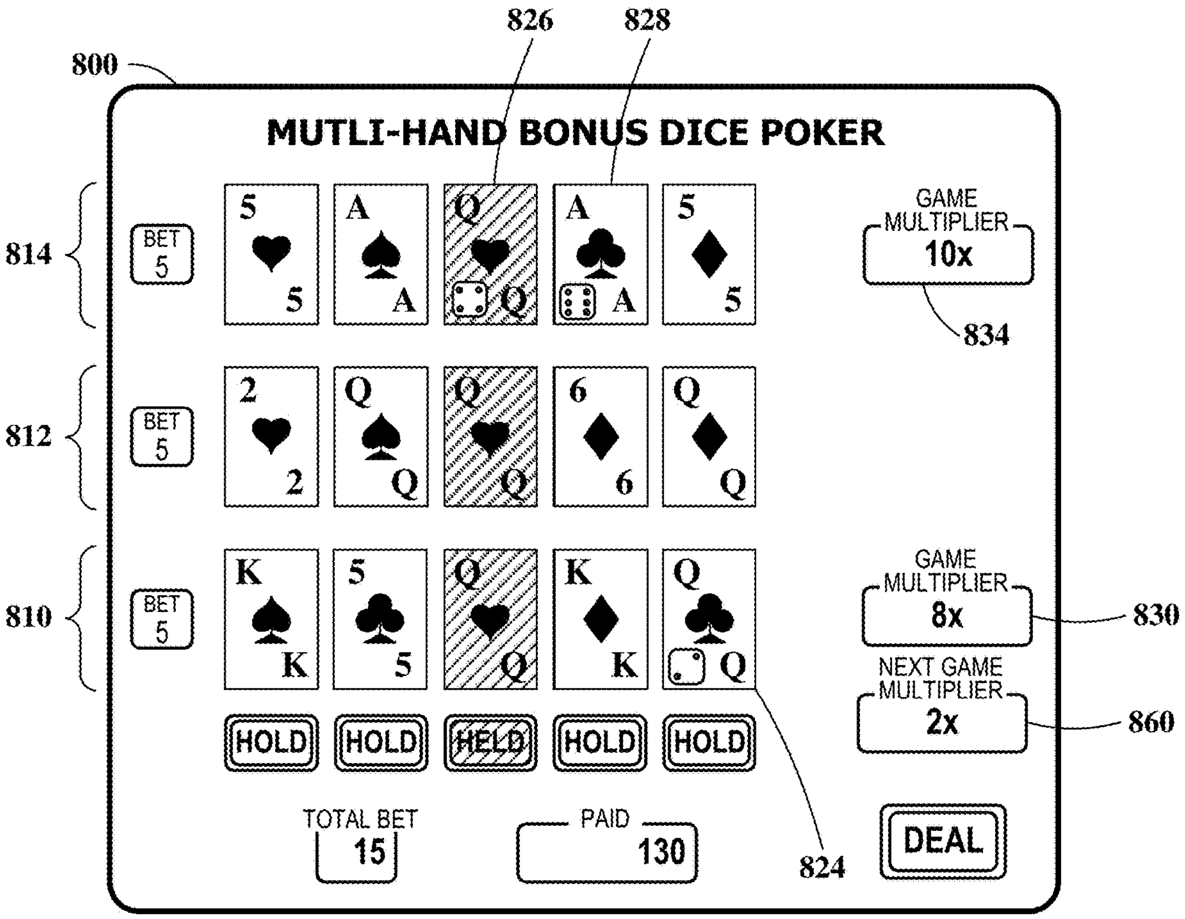
Figure 8C:
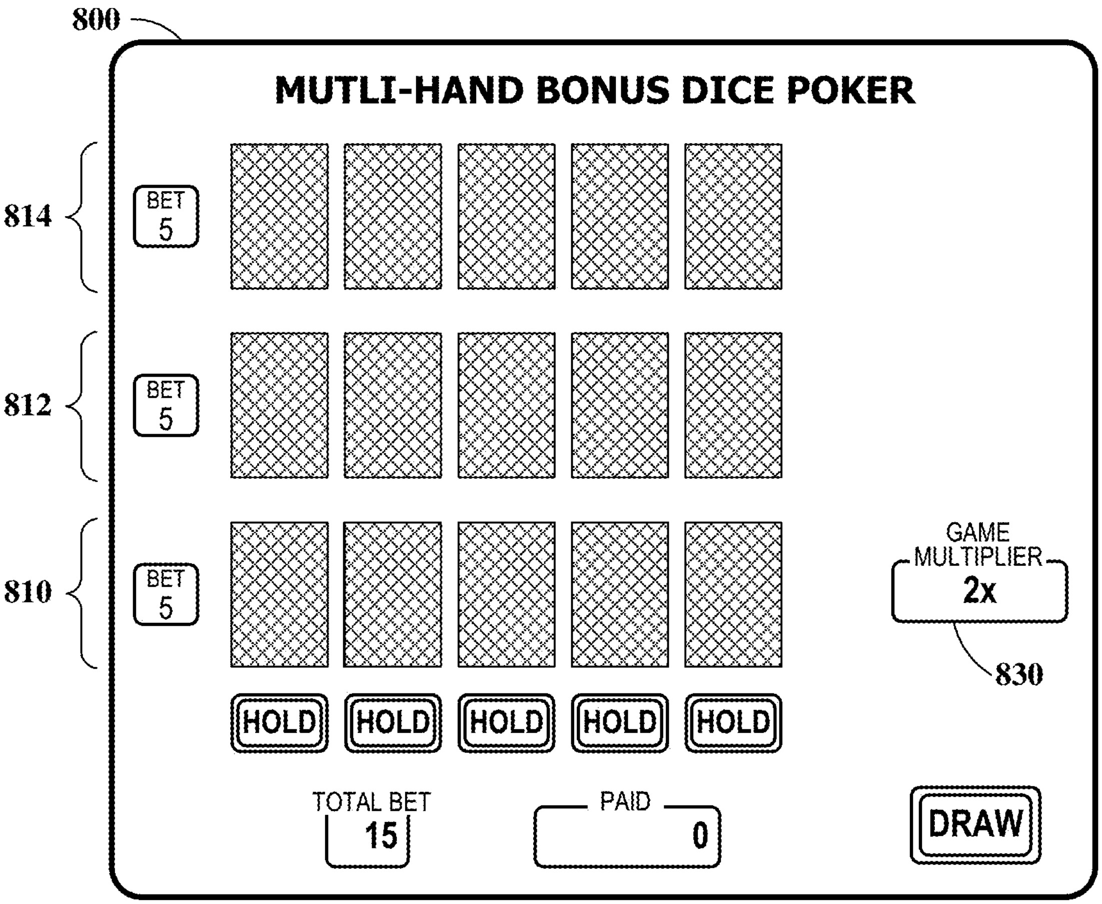

FIGS. 8A-8C are detail diagrams of a game display illustrating a game progression according to embodiments of the invention. These figures illustrate an embodiment where if another bonus feature is triggered for a game (or poker hand) that already is associated with a bonus modifier from a previous game, the new bonus modifier may be automatically saved for a subsequent game. Alternatively, in other embodiments not shown, the existing bonus modifier may be combined with the new bonus modifier for use on the current game. This combined modifier may be used on a subsequent game if the current game does not satisfy a use condition, or only the new modifier may be carried forward for use on a subsequent game if the current game does not satisfy a use condition.

Referring to FIG. 8A, a game display shows a first poker hand 810, a second poker hand 812, and a third poker hand 814. Here, the first poker hand 810 is already associated with an “8×” bonus multiplier, as shown in the first multiplier meter 830. After the Queen of Hearts is held in the third card position and the Draw Button is activated, additional subsymbol cards are received from the draw as shown in FIG. 8B. Referring to FIG. 8B, a drawn Queen of Clubs in the first poker hand 510 becomes a first subsymbol card 824 with a bonus multiplier value of “2×” (as shown on the received subsymbol), the held Queen of Hearts in the third poker hand 814 becomes a second subsymbol card 826 with a bonus multiplier value of “4×”, and the a drawn Ace of Clubs in the third poker hand because the third subsymbol card 828 with a bonus multiplier value of “6×”. Note here that even thought the Queen of Hearts was held in all of the poker hands 510, 512, 514 there was still a chance that those cards would be bonus subsymbol cards on the draw to preserve normal poker strategy during the hold and draw parts of the poker game. In other embodiments, however, held cards may be ineligible to receive bonus subsymbols on the draw. Here, the values of the bonus multipliers in the third poker hand 514 are summed to give a “10×” multiplier for use on the outcome of the third poker hand as shown in the third multiplier meter 834, while on the first poker hand the newly received “2×” multiplier is kept as a next game multiplier as shown in a first next-game multiplier meter 860. In other embodiments, the newly received “2×” multiplier from the draw on the first poker hand could be combined with the existing “8×” multiplier to give a “10×” multiplier for the current outcome of the first poker hand 810. FIG. 8C shows that the next poker gaming event is triggered and the “2×” from the first next-game multiplier meter 860 in FIG. 8B is now shown in the first multiplier meter 830 to be used on the first hand 810 in this next poker gaming event.

Figure 9:
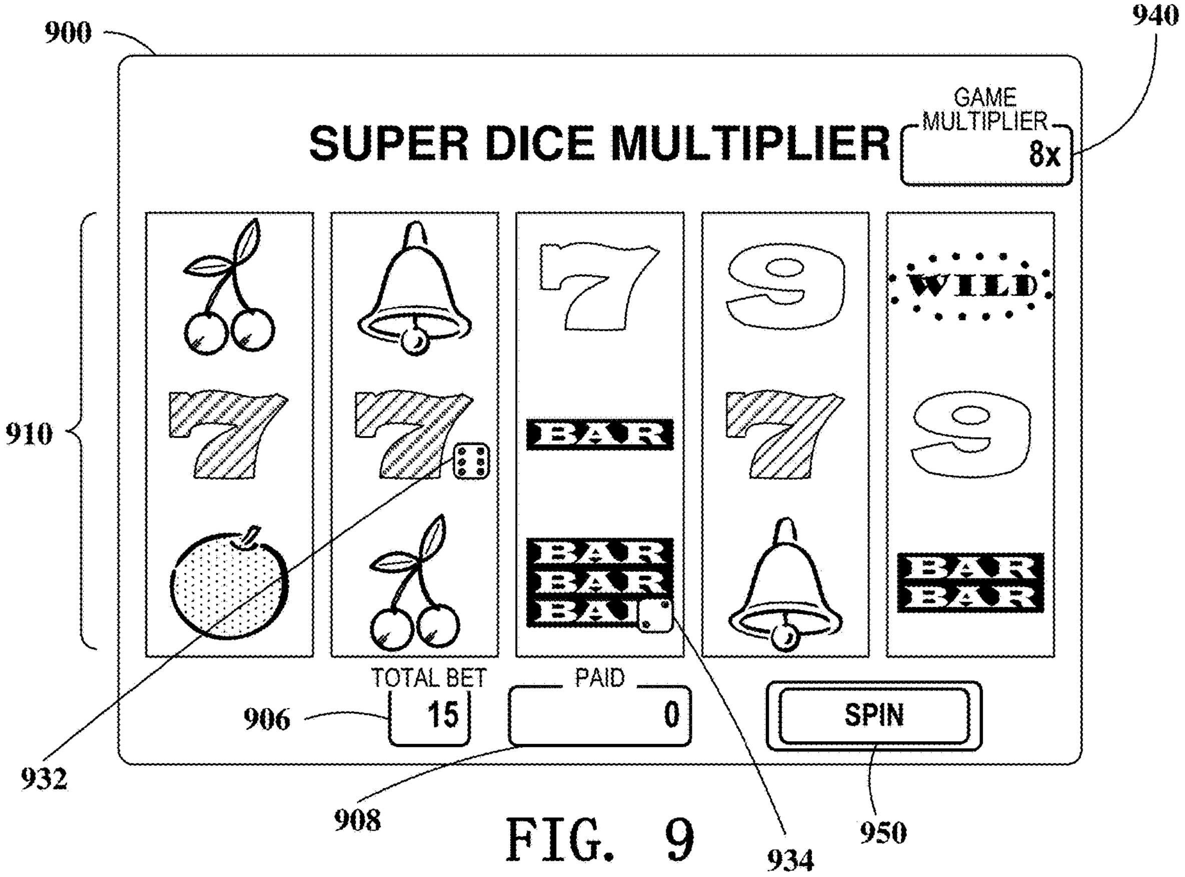
FIG. 9 is a detail diagram of a game display illustrating a game feature according to embodiments of the invention.

FIG. 9 is a detail diagram of a game display illustrating a game feature according to embodiments of the invention. FIG. 9 shows that embodiments of this concept can be used with spinning reel slot games as well. Referring to FIG. 9, a game display 900 includes a game grid 910 of spinning virtual game reels each with a plurality of symbols, as well as a player interface area with various buttons and meters such as Total Bet meter 906, a Paid meter 908, and Spin button 950. In this embodiment, dice subsymbols 932, 934 may be randomly associated with various symbols of the game reels. If those dice subsymbols 932, 934 are received on the game grid 910 as part of the game outcome, the values of the dice subsymbols are combined and used as a bonus multiplier (here, “8×”), as shown on the multiplier meter 940.

Figure 10A:
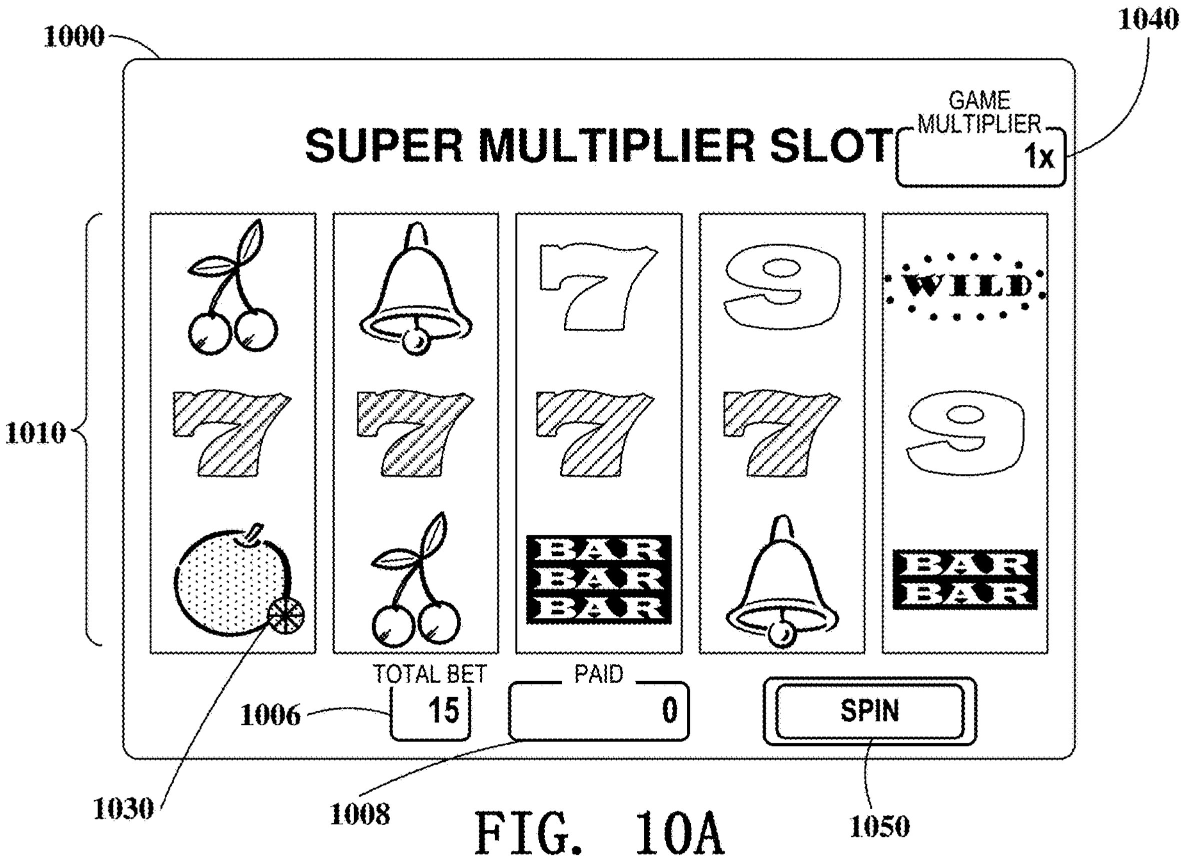
FIGS. 10A-10D are detail diagrams of a game display illustrating a game progression according to embodiments of the invention.
Figure 10B:
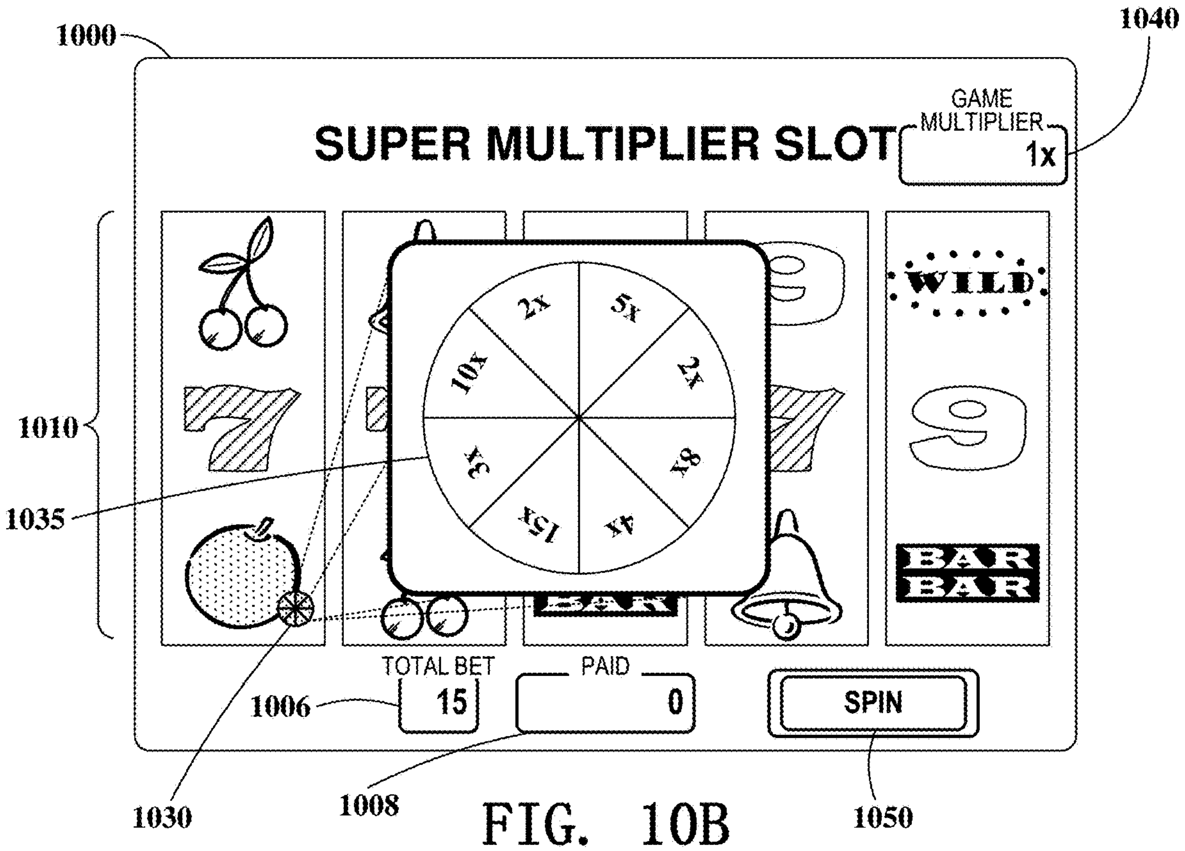
Figure 10C:
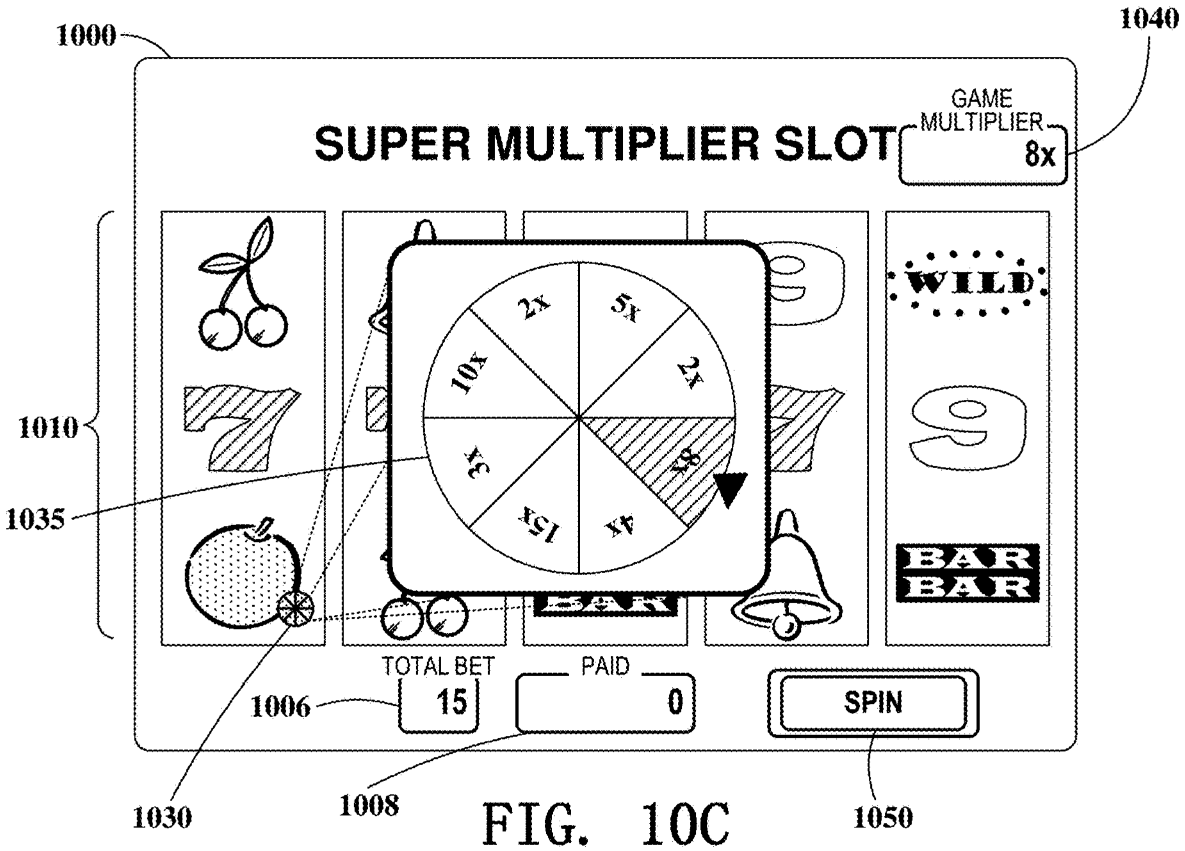
Figure 10D:
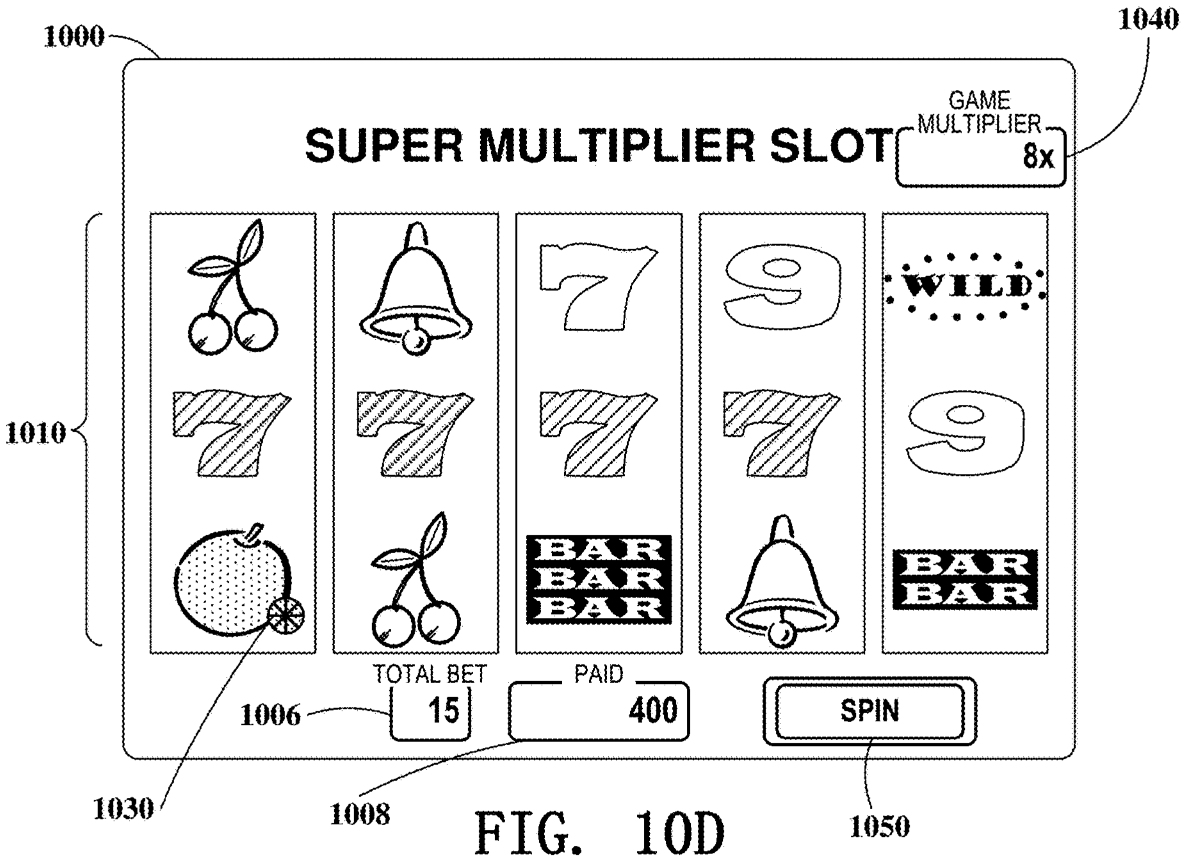

FIGS. 10A-10D are detail diagrams of a game display illustrating a game progression according to embodiments of the invention. These figures illustrate use of a multi-chance feature during a spinning reel slot game. Referring to FIG. 10A, a game display 1000 includes a game grid 1010 of spinning virtual game reels each with a plurality of symbols and a multiplier meter 1040, as well as a player interface area with various buttons and meters such as Total Bet meter 1006, a Paid meter 1008, and Spin button 1050. In this embodiment, one or more subsymbols 1030 may be randomly associated with various symbols of the game reels. If a predetermined number of subsymbols 1030 are received on the game grid 1010 as part of the game outcome, a bonus feature may be triggered. In FIG. 10B, since a bonus subsymbol 1030 was received on the game grid 1010, a bonus area with a bonus wheel 1035 is displayed and initiated. In FIG. 10C, the result of the bonus feature with the bonus wheel 1035 is a bonus outcome of an “8×” multiplier. This multiplier is shown in the multiplier meter 1040, and used to multiply awards won on the spinning reel base game as shown in FIG. 10D.

FIG. 11 is a is a flow diagram illustrating processes in a method of operating a gaming device according to embodiments of the invention. Referring to FIG. 11, flow 1100 begins at process 1110 where a first multi-hand poker game is wagered on and initiated. In process 1120 it is determined if an enhancement game or feature is triggered for any of the hands. Note that they may be triggered on based on the cards dealt, based on the cards drawn, based on are received poker hand, or based on a random determination independent of the cards in the deal or the draw. If an enhancement game is not triggered, the resulting poker hands are displayed in process 1125. If an enhancement game was triggered, the enhancement game is played for each of the poker hands for which such enhancement game was triggered in process 1130. That is, more than one enhancement game may be played in process 1130. In process 1140, the results for each poker hand are displayed. In process 1150, the resulting poker hands are modified by any corresponding bonus modifiers that are respectively associated with those resulting poker hands. In process 1160, the gaming device waits for a signal indicating that a wager and initiation input are received for a next game. When such signal is received, flow 1100 proceeds to process 1170 where the bonus modifiers won in the first multi-hand poker game are applied to the same corresponding poker hands. That is, if a first poker hand in the first poker game had a modifier triggered, that modifier would be also used with the first poker hand in the next poker game. In some embodiments, this modifier may only be kept for the immediate next game, while in other embodiments it may be applied to the set (or random) number of future poker games, until it was used with a winning poker hand, or for a set amount of time.

FIG. 12 is a is another flow diagram illustrating processes in a method of operating a gaming device according to embodiments of the invention. Referring to FIG. 12, flow 1200 begins at process 1210 where a first multi-hand poker game is wagered on and initiated. In process 1220 it is determined if an enhancement game or feature is triggered in the initial deal of cards to a first poker hand. If an enhancement game was triggered, flow 1200 proceeds to process 1225 where the enhancement game is played to receive a bonus modifier. In process 1230 the bonus modifier is applied to all of the poker hands. In process 1235, the held cards from the dealt hand are coped to the other hands and a draw signal is received. In process 1240, the final poker combinations for each poker hand is modified with the bonus modifier. Flow 1200 then proceeds to process 1280 to wait for a next poker game to be initiated. When initiated, flow 1200 proceeds to process 1290 where the next poker game would have the bonus modifiers trigged in the first poker game applied to each of the poker hands in next poker game.

Returning to process 1220, if an enhancement game is not triggered on the deal, flow 1200 proceeds to process 1250 to display the dealt poker hand, copy held cards in the dealt poker hand and receive a draw signal. In process 1260, it is determined if an enhancement game is triggered for any of the draws to the different poker hands. If no enhancement games are triggered, flow 1200 proceeds to process 1265 where the results for each poker hand are displayed. If one ore more enhancement games are triggered, however, flow 1200 proceeds to process 1270 to play those one or more enhancement games to determine one or more bonus modifiers. In process 1275, the bonus modifiers are applied to the respective triggering poker hands to modify the final card combinations in those hands. Flow 1200 then proceeds to process 1280 to wait for a next poker game to be initiated. When initiated, flow 1200 proceeds to process 1290 where the next poker game would have the same bonus modifiers used in the first poker game applied to the corresponding ones of the poker hands in next poker game.

Figure 13A:
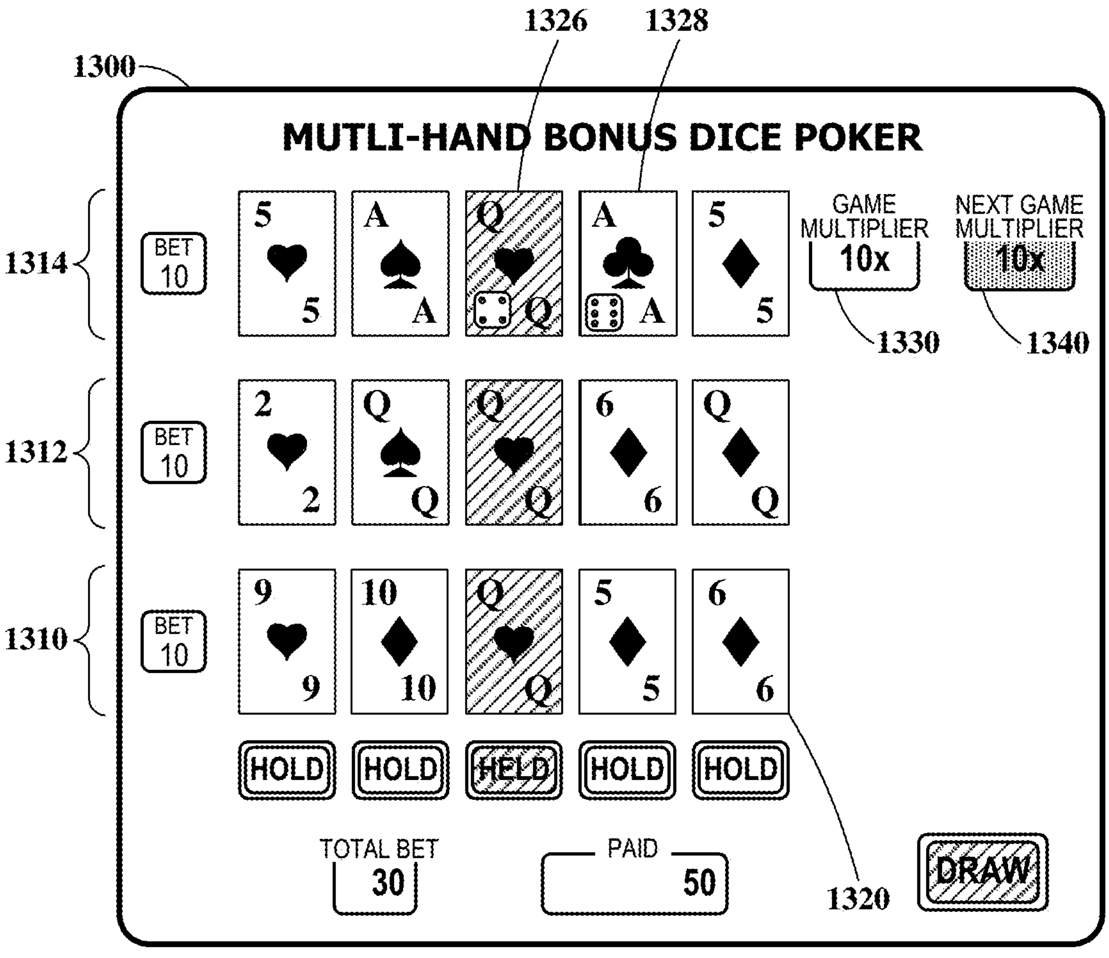
FIGS. 13A-13E are detail diagrams of a game display illustrating a game progression according to embodiments of the invention.
Figure 13B:
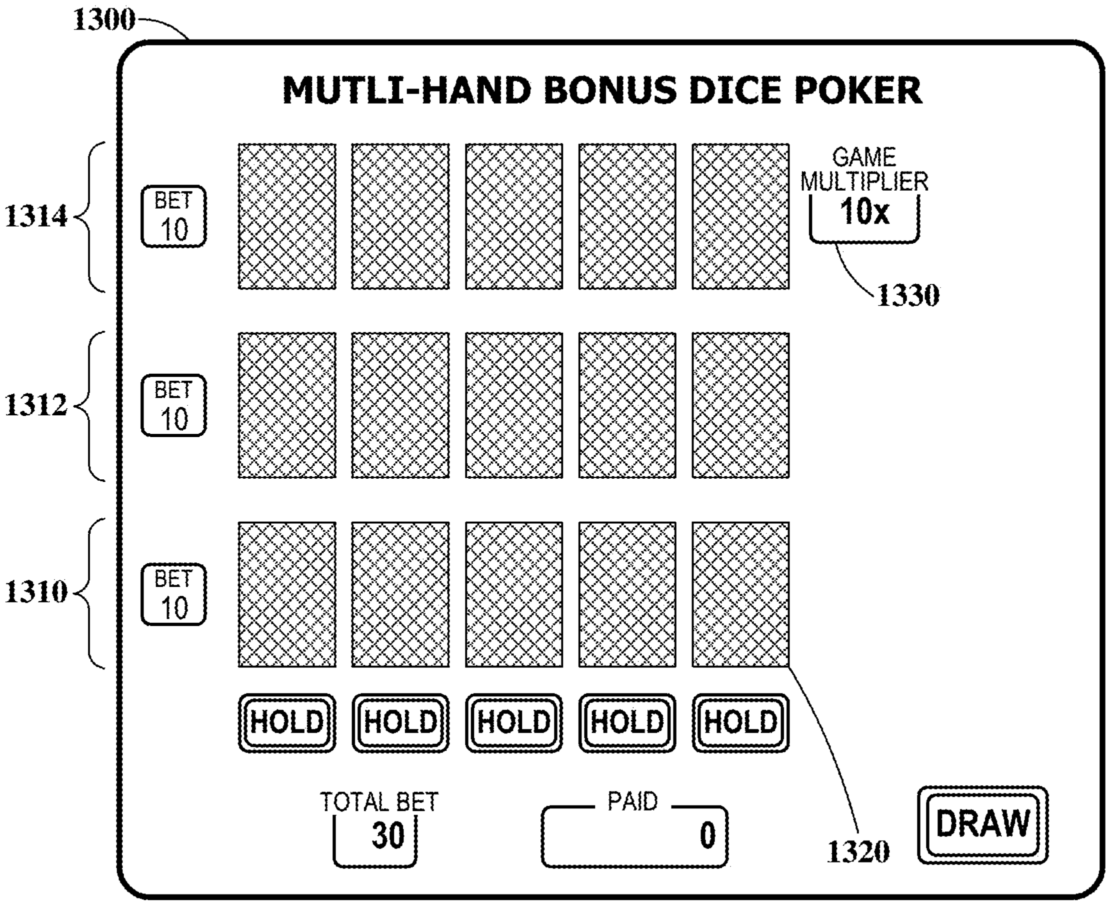
Figure 13C:
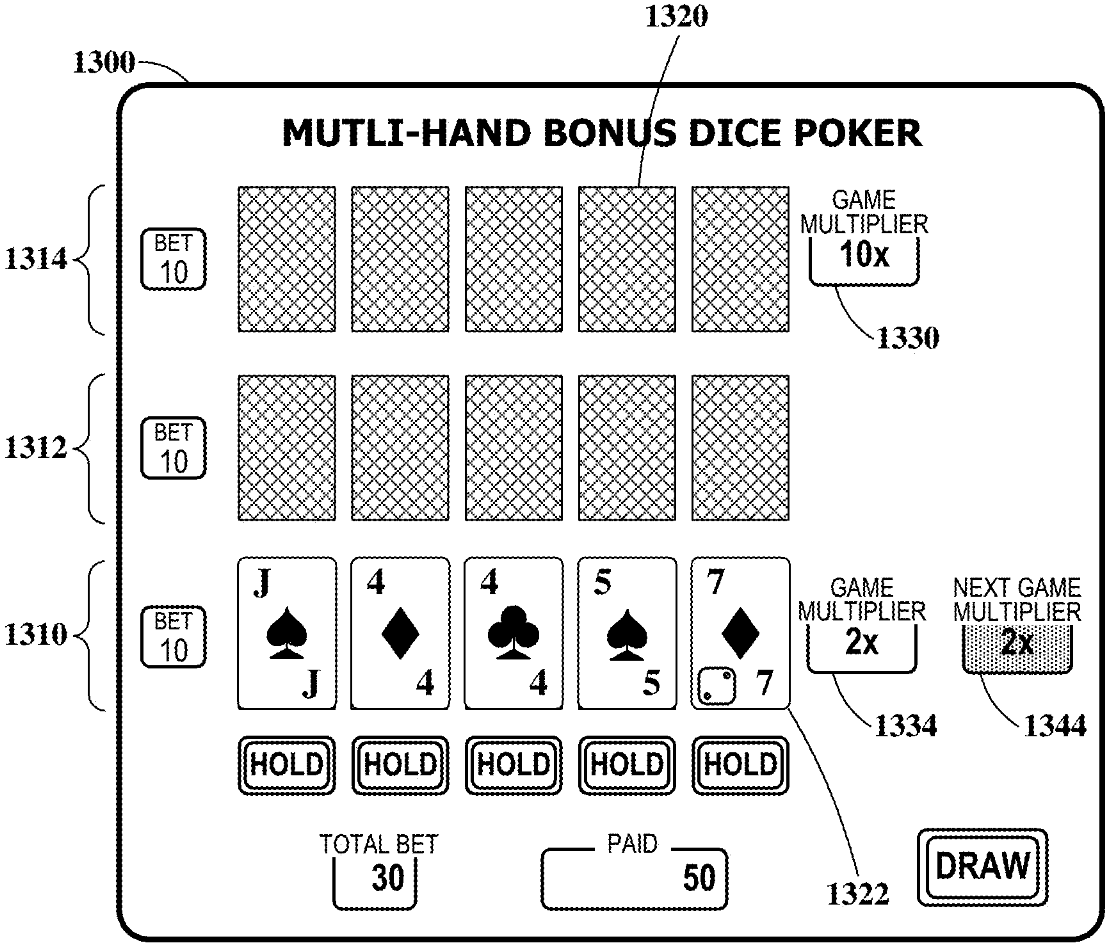
Figure 13D:
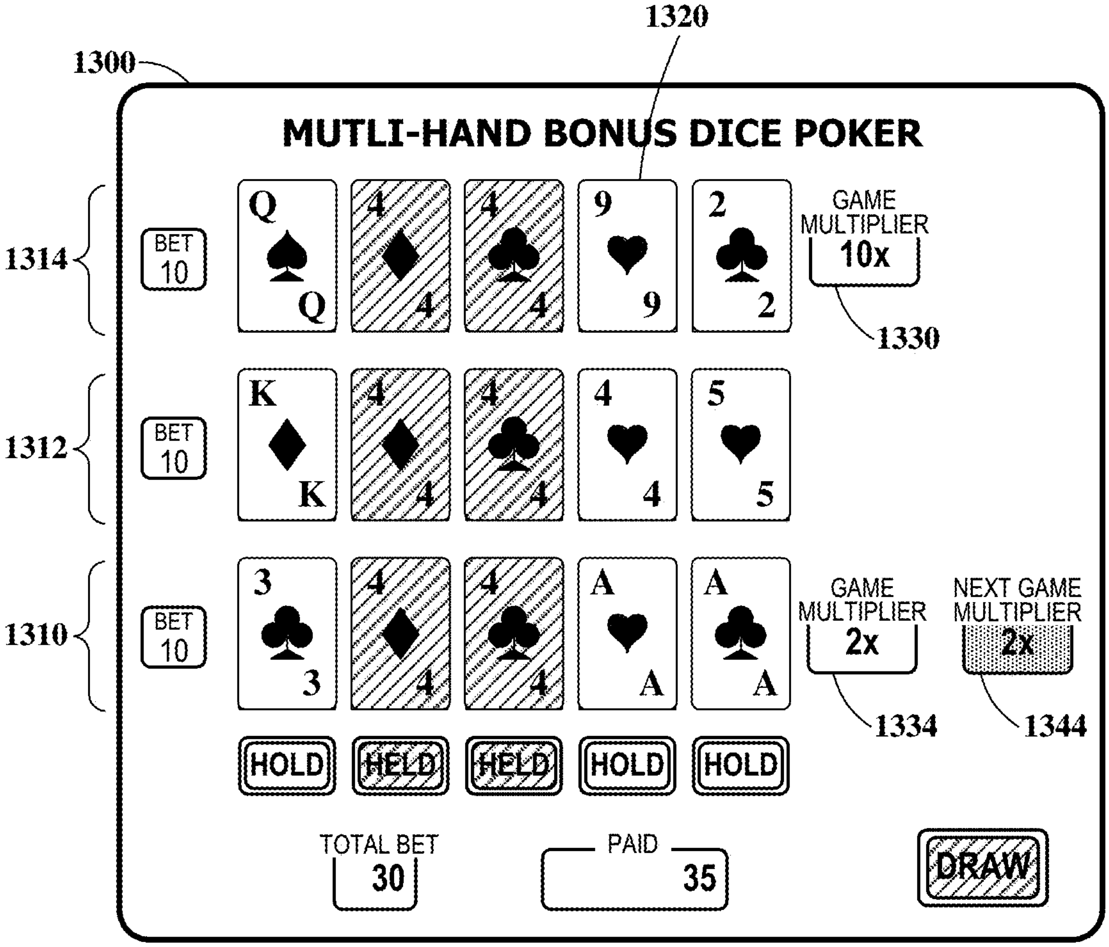
Figure 13E:
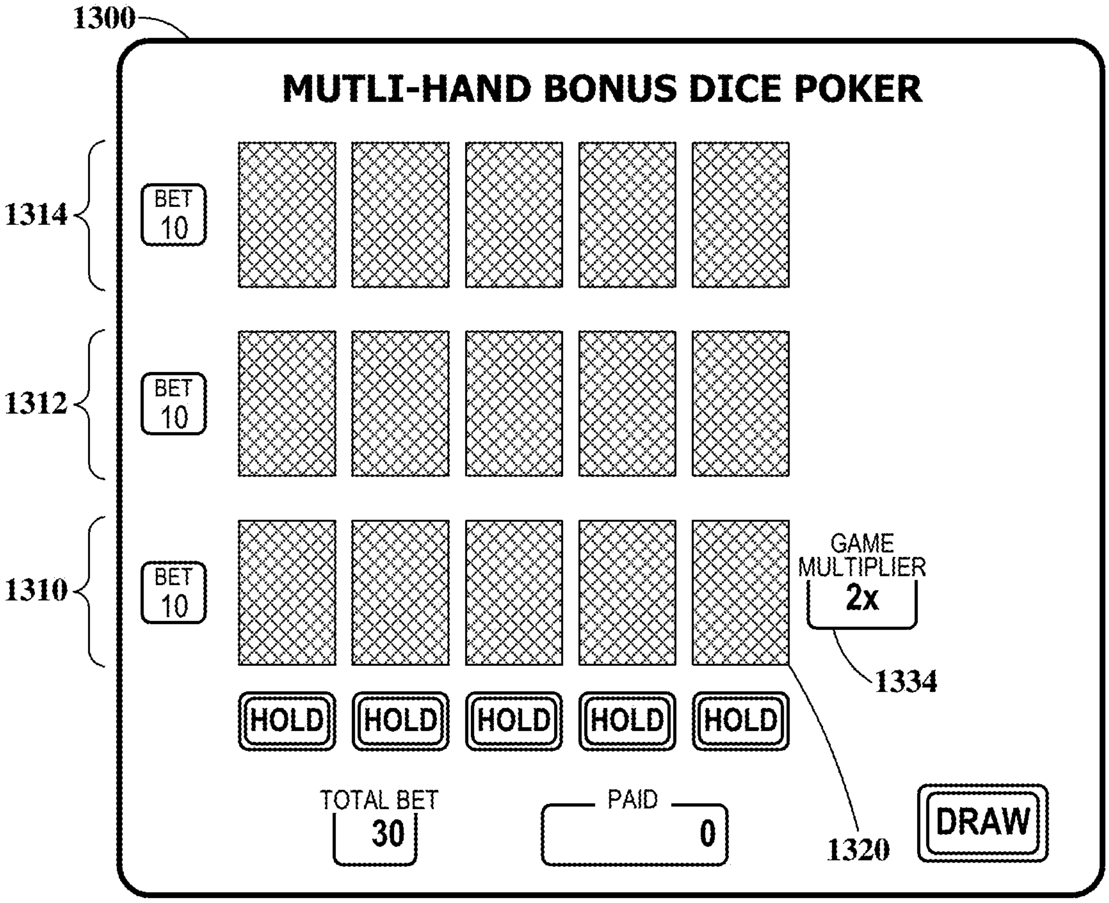

FIGS. 13A-13E are detail diagrams of a game display illustrating a game progression according to embodiments of the invention. Referring to FIGS. 13A-13E, a game display 1300 includes a first poker hand 1310, a second poker hand 1312, and a third poker hand 1314 of virtual playing cards 1320. In FIG. 13A, the result of a first poker game is shown with two subsymbol cards 1326, 1328 in the third poker hand 1314 giving rise to a "10×" bonus multiplier that can be used in the current poker game and a second or next poker game, as shown on the third multiplier meter 1330 and third next-game multiplier meter 1340. In FIG. 13B, the second poker game is initiated and the value in the third next-game multiplier meter 1340 becomes the value in the third multiplier meter 1330. In FIG. 13C, a first poker hand 1310 is dealt and includes a subsymbol card 1322 which generates a bonus multiplier of "2×" as shown in the first multiplier meter 1334 and first next-game multiplier meter 1344. In FIG. 13D, cards are held and drawn. In FIG. 13E, a third poker hand is initiated and the value in the first next-game multiplier meter 1344 becomes the value in the first multiplier meter 1334.

Figure 14A:
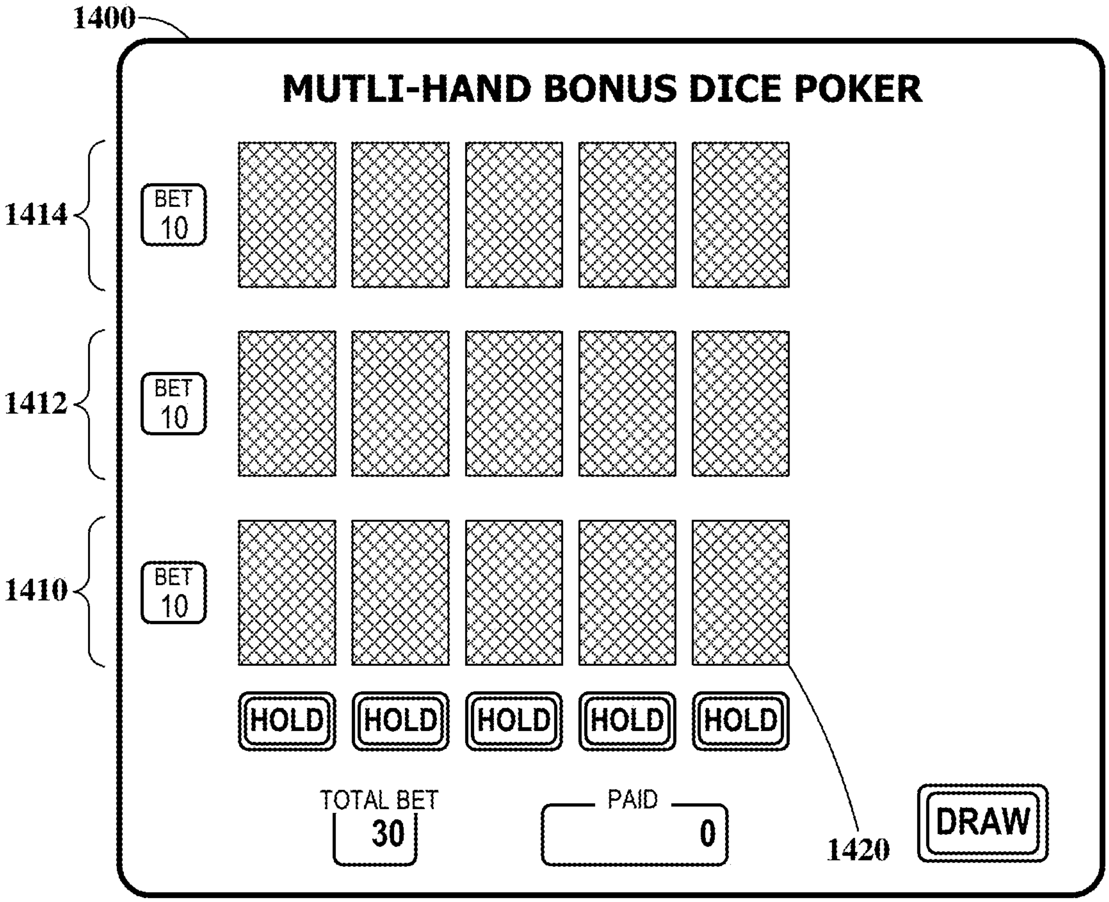
FIGS. 14A-14F are detail diagrams of a game display illustrating another game progression according to embodiments of the invention.
Figure 14B:
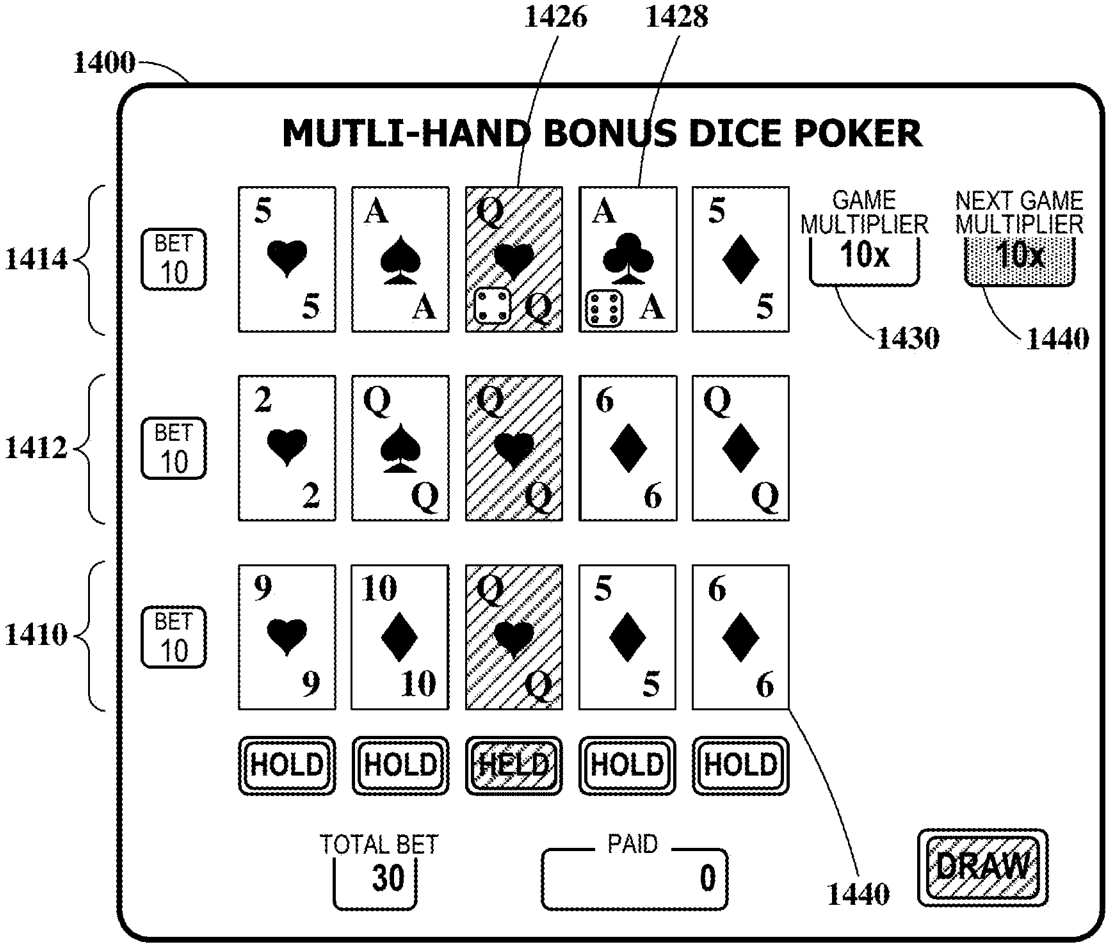
Figure 14C:
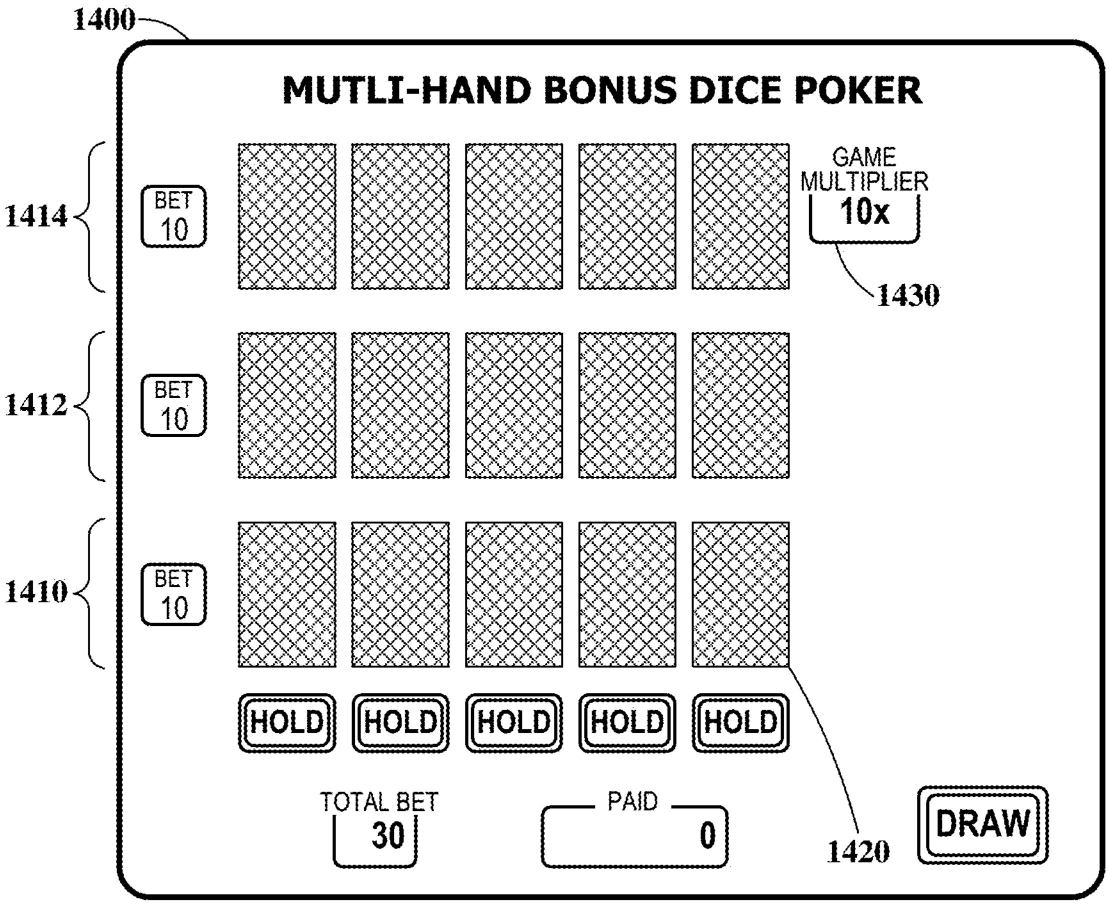
Figure 14D:
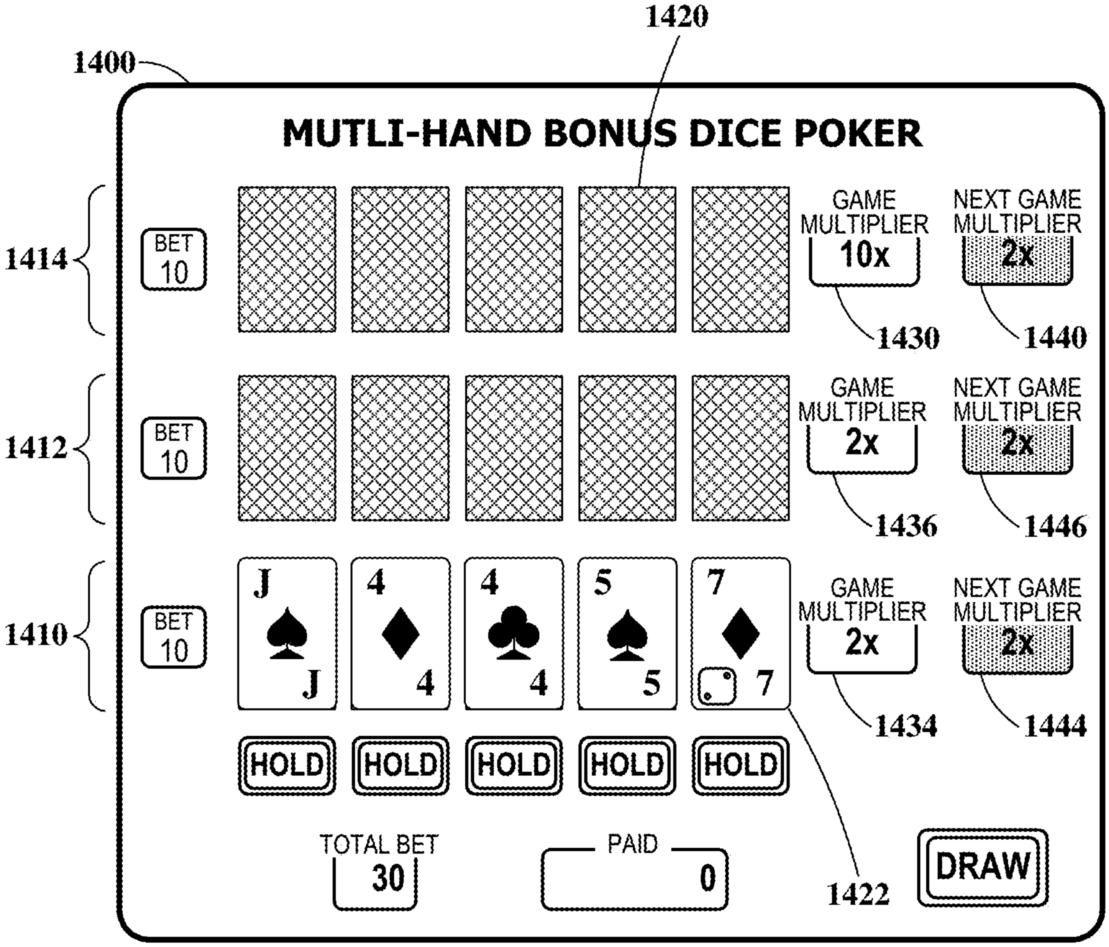
Figure 14E:
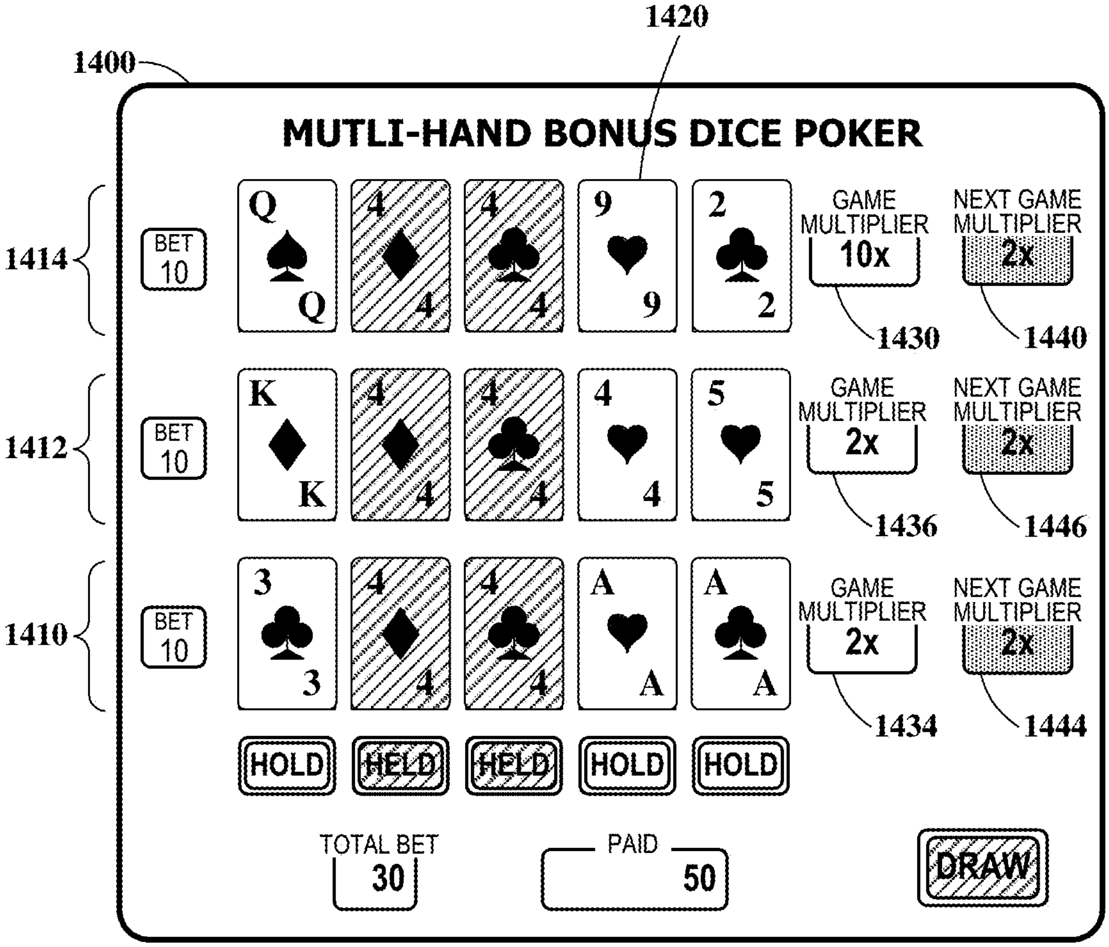
Figure 14F:
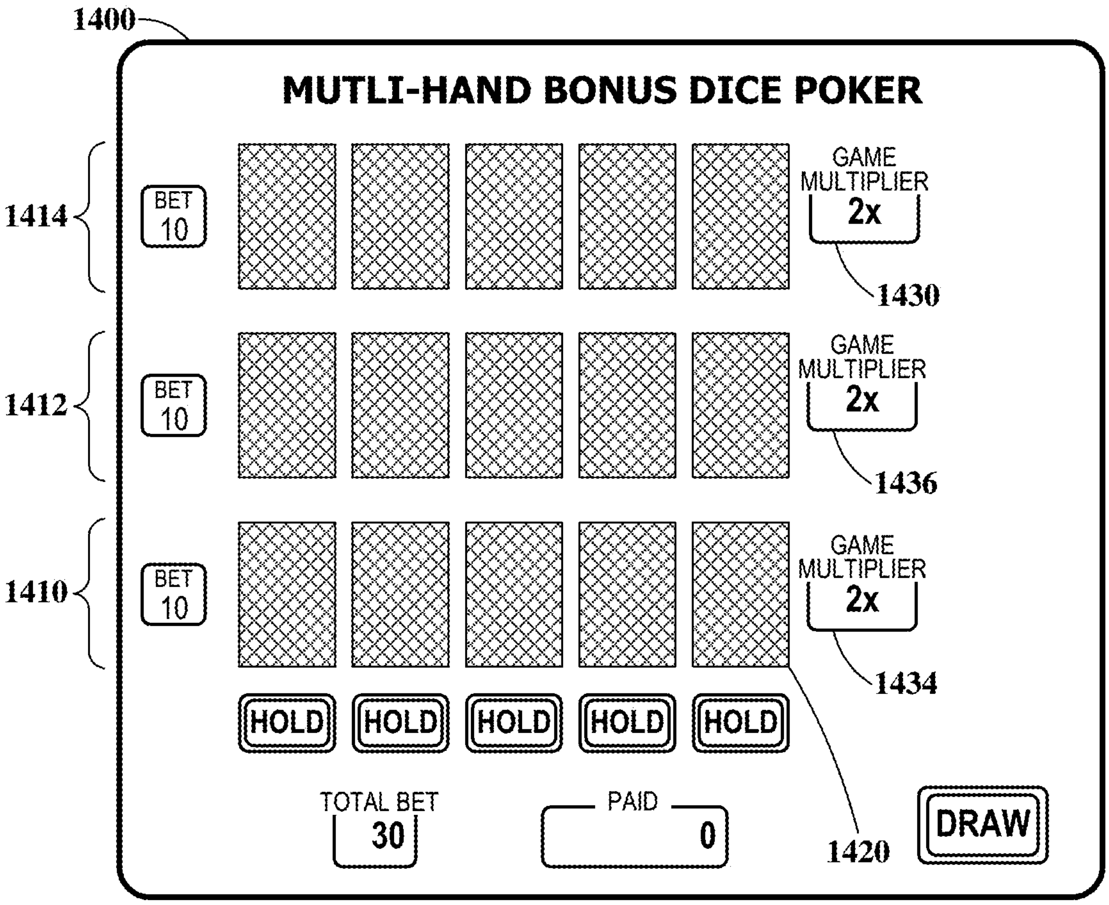

FIGS. 14A-14F are detail diagrams of a game display illustrating another game progression according to embodiments of the invention. Referring to FIGS. 14A-14F a game display 1400 includes a first poker hand 1410, a second poker hand 1412, and a third poker hand 1414 of virtual playing cards 1420. In FIG. 14A, a first poker game is initiated. In 14B, the result of the first poker game is shown with two subsymbol cards 1426, 1428 in the third poker hand 1414 giving rise to a "10×" bonus multiplier that can be used in the current poker game and a second or next poker game, as shown on the third multiplier meter 1430 and third next-game multiplier meter 1440. In FIG. 14C, the second poker game is initiated and the value in the third next-game multiplier meter 1440 becomes the value in the third multiplier meter 1430. In FIG. 14D, a first poker hand 1410 is dealt and includes a subsymbol card 1422 which generates a bonus multiplier of "2×" which is copied to all poker hands as shown in the first multiplier meter 1434 and first next-game multiplier meter 1444. the second multiplier meter 1436 and first next-game multiplier meter 1446, and the third next-game multiplier meter 1140. In FIG. 14E, cards are held and drawn. In FIG. 14F, a third poker hand is initiated and the value in the next-game multiplier meters becomes the value in the multiplier meter for each poker hand.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out herein and in the appended claims.

The invention claimed is:

1. A video poker gaming machine configured to provide games of chance in response to the placement of wagers, the video poker gaming machine comprising:

- a physical gaming cabinet having one or more security locks;
- a display mounted to the cabinet, the display including a first plurality of card positions for displaying a first poker hand, and a second plurality of card positions for displaying a second poker hand;
- a player interface device attached to the cabinet, the player interface device including at least one button and configured to generate signals in response to inputs from a player to facilitate player participation in poker games;
- a memory housed inside the cabinet and configured to store a credit amount and at least one deck of virtual playing cards;
- a random number generator housed inside the cabinet;
- a wager acceptor mounted to the cabinet and structured to receive a physical item associated with a currency value; and
- a processor housed inside of the cabinet and coupled to the display, the player interface, the memory, the random number generator, and the wager acceptor, the processor operable to:
  - receive a signal from the wager acceptor indicating receipt of a physical item associated with a currency value;
  - increase the credit amount in the memory based upon the received signal from the wager acceptor;
  - receive a first game initiation signal from the player interface including a first wager amount to initiate a first poker game, the first game signal indicating a first wager amount, where the credit amount stored in the memory is reduced by the first wager amount;

deal virtual cards randomly selected based on random values provided by the random number generator to the first plurality of card positions on the display to form a first dealt poker hand;

determine if a dice feature is randomly triggered based on random values provided by the random number generator after the first dealt poker hand is displayed, wherein if a dice feature is triggered:

randomly roll at least one die based on random values provided by the random number generator to generate a dice value outcome, associate the dice value outcome with a first bonus multiplier, and associate the first bonus multiplier with the first poker hand and the second poker hand;

receive at least one signal from the player interface indicating cards to hold, if any, in the first dealt poker hand, where any cards held in the first dealt poker hand are copied to associated card positions in the second poker hand;

receive a signal from the player interface initiating a draw of new virtual cards that are selected at random based on random values provided by the random number generator to replace cards not held in the first dealt poker hand and to fill in any card positions in the second poker hand to respectively form a first final poker hand and a second final poker hand for the first poker game;

determine if a dice feature is randomly triggered based on random values provided by the random number generator after the first final poker hand and second final poker hand are displayed, wherein if a dice feature is triggered for the first poker hand:

randomly roll at least one die based on random values provided by the random number generator to generate a dice value outcome, associate the dice value outcome with a second bonus multiplier, and associate the second bonus multiplier with the first poker hand;

determine if a dice feature is randomly triggered based on random values provided by the random number generator after the first final poker hand and second final poker hand are displayed, wherein if a dice feature is triggered for the second poker hand:

randomly roll at least one die based on random values provided by the random number generator to generate a dice value outcome, associate the dice value outcome with a third bonus multiplier, and associate the third bonus multiplier with the second poker hand;

evaluate the first final poker hand to determine first awards associated with the first poker hand;

multiply any determined first awards for the first poker hand with the first bonus multiplier if a first bonus multiplier is associated with the first poker hand;

multiply any determined first awards for the first poker hand with the second bonus multiplier if a second bonus multiplier is associated with the first poker hand and a first bonus multiplier is not associated with the first poker hand;

evaluate the second final poker hand to determine second awards associated with the second poker hand;

multiply any determined second awards for the second poker hand with the first bonus multiplier if a first bonus multiplier is associated with the second poker hand;

multiply any determined second awards for the second poker hand with the third bonus multiplier if a third bonus multiplier is associated with the second poker hand and a first bonus multiplier is not associated with the second poker hand;

increase the credit amount in the memory based on the determined first poker awards as multiplied and the determined second poker awards as multiplied;

receive a second game initiation signal from the player interface including a second wager amount to initiate a second poker game, the second game initiation signal indicating a second wager amount, where the credit amount stored in the memory is reduced by the second wager amount;

associate the second bonus multiplier with the first poker hand for the second poker game if the second bonus multiplier was associated with the first poker hand in the first poker game;

associate the first bonus multiplier with the first poker hand for the second poker game if the first poker hand was associated with the first bonus multiplier but not associated with the second bonus multiplier in the first poker game;

associate the third bonus multiplier with the second poker hand for the second poker game if the third bonus multiplier was associated with the second poker hand in the first poker game; and associate the first bonus multiplier with the second poker hand for the second poker game if the second poker hand was associated with the first bonus multiplier but not associated with the third bonus multiplier in the first poker game.

2. The video poker gaming machine of claim 1, wherein multiple dice are used in the bonus dice feature, and wherein the dice value outcome is determined by summing the values shown on faces of the multiple dice as outcomes.

3. The video poker gaming machine of claim 1, wherein the bonus multiplier is equal to the dice value outcome.

4. The video poker gaming machine of claim 1, wherein a bonus dice feature is triggered when a randomly chosen number from the random number generator falls within a predefined range of numbers.

5. The video poker gaming machine of claim 1, wherein a bonus dice feature is triggered when a predefined virtual card is randomly selected and displayed.

6. The video poker gaming machine of claim 1, wherein the player interface includes at least one physical button capable of generating and transmitting a signal to the processor when the physical button is activated.

7. The video poker gaming machine of claim 1, further comprising randomly selecting a number of dice to roll based on random values provided by the random number generator prior to determining a dice value outcome.

8. The video poker gaming machine of claim 1, wherein the processor is further operable to:

determine if the dice value outcome is associated with a bonus-terminating event; and set the bonus multiplier to a “1×” value when the dice value outcome is associated with the bonus-terminating event.

9. The video poker gaming machine of claim 1, wherein the processor is further operable to:

determine if the dice value outcome is the same as a stored value of a preceding dice value outcome; and increase the associated bonus multiplier by a predefined amount when the dice value outcome is the same as the stored value of a preceding dice value outcome.

10. A video poker gaming machine configured to provide games of chance in response to the placement of wagers, the video poker gaming machine comprising:

a physical gaming cabinet having one or more security locks;

a display mounted to the cabinet, the display including a game grid of card positions forming at least one poker hand;

a player interface device attached to the cabinet, the player interface device including at least one button and configured to generate signals in response to inputs from a player to facilitate player participation in poker games;

a memory housed inside the cabinet and configured to store a credit amount and at least one deck of virtual playing cards;

a random number generator housed inside the cabinet;

a wager acceptor mounted to the cabinet and structured to receive a physical item associated with a currency value; and a processor housed inside of the cabinet and coupled to the display, the player interface, the memory, the random number generator, and the wager acceptor, the processor operable to:

receive a signal from the wager acceptor indicating receipt of a physical item associated with a currency value;

increase the credit amount in the memory based upon the received signal from the wager acceptor;

receive a first game initiation signal from the player interface including a first wager amount to initiate a first poker game, the first game signal indicating a first wager amount, where the credit amount stored in the memory is reduced by the first wager amount;

determine if a bonus multiplier feature is randomly triggered based on random values provided by the random number generator;

initiate the bonus multiplier feature when the bonus multiplier feature is determined to be triggered to randomly determine a bonus multiplier based on random values provided by the random number generator;

randomly select a plurality of virtual playing cards based on random values provided by the random number generator to present in the card positions of the poker hand for the first poker game;

display a first final poker hand of the first poker game on the display;

evaluate the first final poker hand for the first poker game to determine first awards associated with the first poker game;

multiply any determined first awards for the first poker game with the bonus multiplier, if any;

increase the credit amount stored in the memory based on the multiplied first awards;

receive a second game initiation signal from the player interface including a second wager amount to initiate a second poker game, the second game initiation signal indicating a second wager amount, where the credit amount stored in the memory is reduced by the second wager amount;

randomly select a plurality of virtual playing cards based on random values provided by the random number generator to present in the card positions to form a poker hand for the second poker game;

display a second final poker hand of the second poker game on the display;

evaluate the second final poker hand of the second poker game to determine second awards associated with the second poker game;

multiply any determined second awards for the second poker game with the bonus multiplier, if any; and increase the credit amount stored in the memory based on the multiplied second awards.

11. The video poker gaming machine of claim 10, wherein the bonus multiplier feature includes a bonus dice feature that when initiated causes the processor to:

randomly roll at least one die based on random values provided by the random number generator to generate a dice value outcome; and associate the dice value outcome, if any, with a bonus multiplier.

12. The video poker gaming machine of claim 11, wherein multiple dice are used in the bonus dice feature, and wherein the dice value outcome is determined by summing the values shown on faces of the multiple dice as outcomes.

13. The video poker gaming machine of claim 11, wherein the bonus multiplier is equal to the dice value outcome.

14. The video poker gaming machine of claim 11, further comprising randomly selecting a number of dice to roll prior to determining a dice value outcome.

15. The video poker gaming machine of claim 11, wherein the processor is further operable to:

determine if the dice value outcome is associated with a bonus-terminating event; and set the bonus multiplier to a "1×" value when the dice value outcome is associated with the bonus-terminating event.

16. The video poker gaming machine of claim 11, wherein the processor is further operable to:

determine if the dice value outcome is the same as a stored value of a preceding dice value outcome; and increase the associated bonus multiplier by a predefined amount when the dice value outcome is the same as the stored value of a preceding dice value outcome.

17. The video poker gaming machine of claim 10, wherein a bonus multiplier feature is triggered when a randomly chosen number from the random number generator falls within a predefined range of numbers.

18. The video poker gaming machine of claim 10, wherein a bonus multiplier feature is triggered when a predefined card appears in the first poker game result.

19. The video poker gaming machine of claim 10, further comprising receiving signals indicating a card selected by a player, wherein a bonus multiplier feature is triggered when the selected card appears in the first poker game result.

20. A video poker gaming machine configured to provide games of chance in response to the placement of wagers, the video poker gaming machine comprising:

a physical gaming cabinet having one or more security locks;

a display mounted to the cabinet, the display including a game grid of card positions forming at least one poker hand;

a player interface device attached to the cabinet, the player interface device including at least one button and configured to generate signals in response to inputs from a player to facilitate player participation in poker games;

a memory housed inside the cabinet and configured to store a credit amount and at least one deck of virtual playing cards;

a random number generator housed inside the cabinet;

a wager acceptor mounted to the cabinet and structured to receive a physical item associated with a currency value; and a processor housed inside of the cabinet and coupled to the display, the player interface, the memory, the random number generator, and the wager acceptor, the processor operable to:

receive a signal from the wager acceptor indicating receipt of a physical item associated with a currency value;

increase the credit amount in the memory based upon the received signal from the wager acceptor;

receive a first game initiation signal from the user interface including a first wager amount to initiate a first poker game, the first game signal indicating a first wager amount, where the credit amount stored in the memory is reduced by the first wager amount;

determine if a bonus feature is randomly triggered based on random values provided by the random number generator;

initiate the bonus feature when the bonus feature is determined to be triggered to randomly determine a bonus modifier based on random values provided by the random number generator;

randomly select a plurality of virtual playing cards based on random values provided by the random number generator to present in the card positions of the poker hand for the first poker game;

display a first final poker hand of the first poker game on the display;

modify the first final poker hand of the first poker game on the display with the bonus modifier, if any;

evaluate the modified first final poker hand for the first poker game to determine first awards associated with the first poker game;

increase the credit amount in memory based on the first awards;

receive a second game initiation signal from the user interface including a second wager amount to initiate a second poker game, the second game initiation signal indicating a second wager amount, where the credit amount stored in the memory is reduced by the second wager amount;

randomly select a plurality of virtual playing cards based on random values provided by the random number generator to present in the card positions to form a poker hand for the second poker game;

display a second final poker hand of the second poker game on the display;

modify the second final poker hand of the second poker game on the display with the bonus modifier, if any;

evaluate the second final poker hand of the second poker game to determine second awards associated with the second poker game; and increase the credit amount stored in the memory based on the second awards.

* * * * *